United States Patent
Garudadri et al.

(10) Patent No.: US 7,089,178 B2
(45) Date of Patent: Aug. 8, 2006

(54) MULTISTREAM NETWORK FEATURE PROCESSING FOR A DISTRIBUTED SPEECH RECOGNITION SYSTEM

(75) Inventors: Harinath Garudadri, San Diego, CA (US); Sunil Sivadas, Portland, OR (US); Hynek Hermansky, Portland, OR (US); Nelson H. Morgan, Oakland, CA (US); Charles C. Wooters, Albany, CA (US); Andre Gustavo Adami, Hillsboro, OR (US); Maria Carmen Benitez Ortuzar, Granada (ES); Lukas Burget, Hillsboro, OR (US); Stephane N. Dupont, Saint-Vaast (BE); Frantisek Grezl, Olomouc (CZ); Pratibha Jain, Beaverton, OR (US); Sachin Kajarekar, Portland, OR (US); Petr Motlicek, Brno (CZ)

(73) Assignee: Qualcomm Inc., San Diego, CA (US)

( * ) Notice: Subject to any disclaimer, the term of this patent is extended or adjusted under 35 U.S.C. 154(b) by 477 days.

(21) Appl. No.: 10/137,633

(22) Filed: Apr. 30, 2002

(65) Prior Publication Data

US 2003/0204394 A1 Oct. 30, 2003

(51) Int. Cl.
  G10L 15/02 (2006.01)
  G10L 15/04 (2006.01)
  G10L 15/16 (2006.01)
(52) U.S. Cl. ............... 704/205; 704/202; 704/203; 704/232; 704/233; 704/254; 704/208; 704/270.1
(58) Field of Classification Search ............... 704/205, 704/202, 203, 232, 233, 254, 208, 270.1
See application file for complete search history.

(56) References Cited

U.S. PATENT DOCUMENTS

| 4,901,307 | A | | 2/1990 | Gilhousen et al. |
| 5,103,459 | A | | 4/1992 | Gilhousen et al. |
| 5,450,522 | A | | 9/1995 | Hermansky et al. |
| 5,504,773 | A | | 4/1996 | Padovani et al. |
| 5,890,108 | A | * | 3/1999 | Yeldener .................... 704/208 |
| 5,956,683 | A | | 9/1999 | Jacobs et al. |
| 2003/0004720 | A1 | * | 1/2003 | Garudadri et al. .......... 704/247 |

(Continued)

OTHER PUBLICATIONS

Grigore, Mihaela and Inge Gavat. "Vowel Recognition with Nonlinear Perceptron". Semiconductor□□Conference, 1996. International vol. 1, Oct. 9-12, 1996. pp. 155-158 vol. 1.*

(Continued)

*Primary Examiner*—Talivaldis Ivars Smits
*Assistant Examiner*—Matthew Kern
(74) *Attorney, Agent, or Firm*—Philip R. Wadsworth; Charles D. Brown; George C. Poppas

(57) ABSTRACT

A distributed voice recognition system and method for obtaining acoustic features and speech activity at multiple frequencies by extracting high frequency components thereof on a device, such as a subscriber station and transmitting them to a network server having multiple stream processing capability, including cepstral feature processing, MLP nonlinear transformation processing, and multiband temporal pattern architecture processing. The features received at the network server are processed using all three streams, wherein each of the three streams provide benefits not available in the other two, thereby enhancing feature interpretation. Feature extraction and feature interpretation may operate at multiple frequencies, including but not limited to 8 kHz, 11 kHz, and 16 kHz.

22 Claims, 13 Drawing Sheets

U.S. PATENT DOCUMENTS

2003/0061036 A1* 3/2003 Garudadri et al. .......... 704/208
2003/0061042 A1* 3/2003 Garudadri ................... 704/254
2003/0115054 A1* 6/2003 Iso-Sipila ................... 704/233
2003/0144834 A1* 7/2003 Macho et al. ............... 704/205

OTHER PUBLICATIONS

ETSI ES 201 108 V1.1.2 (Apr. 2000) Speech processing, transmission and quality aspects; Distributed speech recognition; Front-end feature extraction algorithm; and Compression Algorithms.*

Davenport, Michaal and Harinath Garudadri. "A neural net acoustic phonetic feature extractor based on wavelets." IEEE Pacific Rim Conference, Computers and signal processing, May 9-10, 1991.p. 449-452.*

* cited by examiner

MULTISTREAM NETWORK FEATURE PROCESSING FOR A DISTRIBUTED SPEECH RECOGNITION SYSTEM

FIELD

The present invention relates generally to the field of communications and more specifically to a distributed voice recognition system employing feature computation, transmission, and extraction utilizing multistream network server processing.

BACKGROUND

Voice recognition (VR), nowadays more precisely called speech recognition, refers to a technique enabling a device to recover linguistic information from user-voiced speech. Once the device recognizes the linguistic information, the device may act on the information or cause another device to act on the information, thus facilitating a human interface with a device. Systems employing techniques to recover a linguistic message from an acoustic speech signal are called voice recognizers, or VR systems.

Recently, communication systems facilitating multiple-access, i.e., simultaneous transmission and/or reception, of several signals over a common communication channel have been developed and achieved widespread usage. Multiple-access communication systems often include a plurality of remote subscriber units requiring intermittent service of relatively short duration rather than continuous access to the common communication channel. Several multiple-access techniques are known in the art, such as time division multiple-access (TDMA) and a frequency division multiple-access (FDMA). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000Spread Spectrum Systems" (the IS-2000 standard).

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

A user usually interfaces with a subscriber station via a keypad and a display. Such an interface imposes certain limits on its operation. For example, when the user is engaged in another activity requiring visual and physical attention to the activity to operate the subscriber station, e.g., driving an automobile, the user must remove his or her hand from the steering wheel and look at the telephone keypad while pushing buttons on the keyboard. Such actions tend divert attention from driving. Even if a full concentration on the interface is assured, certain actions, e.g., entry of short messages in a short message system (SMS) enabled subscriber station, can be cumbersome.

As a result of these user interface problems, there is an interest in implementing a VR system into a subscriber station. In general, a VR system comprises an acoustic processor, also called the front end of the VR system, and a word decoder, also called the back end of the VR system. The acoustic processor performs feature extraction, i.e., extracting a sequence of information bearing features from a speech signal. Feature extraction is necessary for enabling recognition of the speech signal linguistic information. Extracted features are transmitted from the front end to the back end of the VR system. The word decoder decodes the sequence of features received to provide a meaningful and desired output, representing the linguistic information contained in the speech signal.

For complex voice recognition tasks, the computational requirement of the processing associated with VR is significant. In a typical DVR system, the word decoder has relatively high computational and memory requirements as measured against the front end of the voice recognizer. Consequently, it is often desirable to place the feature/word decoding task on a subsystem having the ability to appropriately manage computational and memory requirement, such as a network server, while keeping the acoustic processor physically as close to the speech source as possible to reduce adverse effects associated with vocoders. A vocoder is a device for processing the speech signal prior to transmission. Such a VR system implementation, using distributed system architecture, is known as a Distributed Voice Recognition (DVR) system. Thus, in a DVR system, feature extraction is performed at a device, such as a subscriber station comprising a front end, and the features subscriber station sends the features to the network, comprising a back end. The network decodes the features and provides a desired linguistic output. Examples of DVR systems are disclosed in U.S. Pat. No. 5,956,683, entitled "Distributed Voice Recognition System," assigned to the assignee of the present invention.

Certain DVR systems and designs have been employed with varying results. Certain previous systems have operated at low frequency levels, such as in the range of 4 kHz, and have ignored or omitted certain high frequency components of speech, both on the subscriber station side and the network server side. Performance of such systems tend to favor low frequency components received at the expense of high frequency components, particularly those in excess of about 4 kHz. Failure to properly decode, implement, and pass these high frequency components has a tendency to miss certain aspects of the received analog speech signal and create an improper representation of the speech at the network server. Further, interpretation of received features at the network server has tended to use cepstral features exclusively. Cepstral features provide certain information on the features, but use of cepstral processing alone tends to omit certain aspects of speech, or fail to identify certain properties in the speech that are transferred over as features. Previous systems have also operated at a single or limited frequency, thus potentially again adversely affecting either the quality of the speech transmitted, the quality of features derived, or both.

As follows from the above description, there is a need in the art to extract acoustic features, including the high frequency components thereof, and transmit the features with minimal delay over the network such that the back end may process and employ high frequency components in to provide an enhanced acoustic representation of the received speech signal.

SUMMARY

The aspects described herein are directed to a DVR system and method for obtaining acoustic features and speech activity at multiple frequencies by extracting high frequency components thereof on a device, such as a subscriber station, and transmitting them to a network server having multiple stream processing capability, including cepstral feature processing, MLP nonlinear transformation processing, and multiband temporal pattern architecture processing. Multiple stream processing may occur at a network server. Either or both sides of the DVR may operate at various frequencies, including but not limited to 8 kHz, 11 kHz, and 16 kHz.

According to one aspect of the present invention, there is provided a method of processing, transmitting, receiving, and decoding speech information, comprising receiving signals representing speech, decomposing the signals representing speech into higher frequency components and lower frequency components, processing the higher frequency components and lower frequency components separately and combining processed higher frequency components and lower frequency components into a plurality of features. The method further comprises transmitting the features to a network, receiving the features and processing said received features using a plurality of streams. The plurality of streams includes a cepstral stream, a nonlinear neural network stream, and a multiband temporal pattern architecture stream. The method further includes concatenating all received features processed by the plurality of streams into a concatenated feature vector.

According to a second aspect of the present invention, there is provided a system for processing speech into a plurality of features, comprising an analog to digital converter able to convert analog signals representing speech into a digital speech representation, a fast fourier transform element for computing a magnitude spectrum for the digital speech representation, a power spectrum splitter for splitting the magnitude spectrum into higher and lower frequency components, a noise power spectrum estimator and a noise reducer for estimating the power spectrum and reducing noise of the higher and lower frequency components to noise reduced higher frequency components and noise reduced lower frequency components, a mel filter for mel filtering the noise reduced lower frequency components, and a plurality of linear discriminant analysis filters for filtering the mel filtered noise reduced lower frequency components and the noise reduced lower frequency components. The system further includes a combiner for combining the output of the linear discriminant analysis filters with a voice activity detector representation of the mel filtered noise reduced lower frequency components and a feature compressor for compressing combined data received from the combiner.

According to a third aspect of the present invention, there is provided a system for incorporating information from a relatively long time span of feature vectors. The system includes a multiple stream processing arrangement. The multiple stream processing arrangement includes a cepstral stream processing arrangement for computing mean and variance normalized cepstral coefficients and at least one derivative thereof, a nonlinear transformation of the cepstral stream comprising a multi layer perceptron to discriminate between phoneme classes in said features, and a multiband temporal pattern architecture stream comprising mel spectra reconstruction and at least one multi layer perceptron to discriminate between manner of articulation classes in each mel spectral band. The system further includes a combiner to concatenate features received from the cepstral stream processing arrangement, the nonlinear transformation of the cepstral stream, and the multiband temporal pattern architecture stream.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Definitions

The word "exemplary" is used exclusively herein to mean "serving as an example, instance, or illustration." Any embodiment or aspect described herein as "exemplary" is not necessarily to be construed as preferred or advantageous over other embodiments or aspects.

The term "access network" or "network server" is used herein to mean a collection of access points (AP) or collection of base stations and one or more controllers, including processing hardware coupled thereto by any means. The access network or network server transports data packets between multiple access terminals (AT). The access network or network server may be further connected to additional networks outside the access network, such as a corporate intranet or the Internet, and may transport data packets between each access terminal and such outside networks.

The term "base station," referred to herein as an AP in the case of an HDR communication system, is used exclusively herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term "subscriber station," referred to herein as an AT in the case of an HDR communication system, is used exclusively herein to mean the hardware with which an access network communicates. An AT may be mobile or stationary. An AT may be any data device that communicates through a wireless channel or through a wired channel, for example using fiber optic or coaxial cables. An AT may further be any of a number of types of devices including but not limited to PC card, compact flash, external or internal modem, or wireless or wireline phone. An AT that is in the process of establishing an active traffic channel connection with an AP is said to be in a connection setup state. An AT that has established an active traffic channel connection with an AP is called an active AT, and is said to be in a traffic state.

The term "communication channel/link" is used exclusively herein to mean a single route over which a signal is transmitted described in terms of modulation characteristics and coding, or a single route within the protocol layers of either the AP or the AT.

The term "reverse channel/link" is used exclusively herein to mean a communication channel/link through which the AT sends signals to the AP.

The term "forward channel/link" is used exclusively herein to mean a communication channel/link through which an AP sends signals to an AT.

DESCRIPTION

Figure 1:
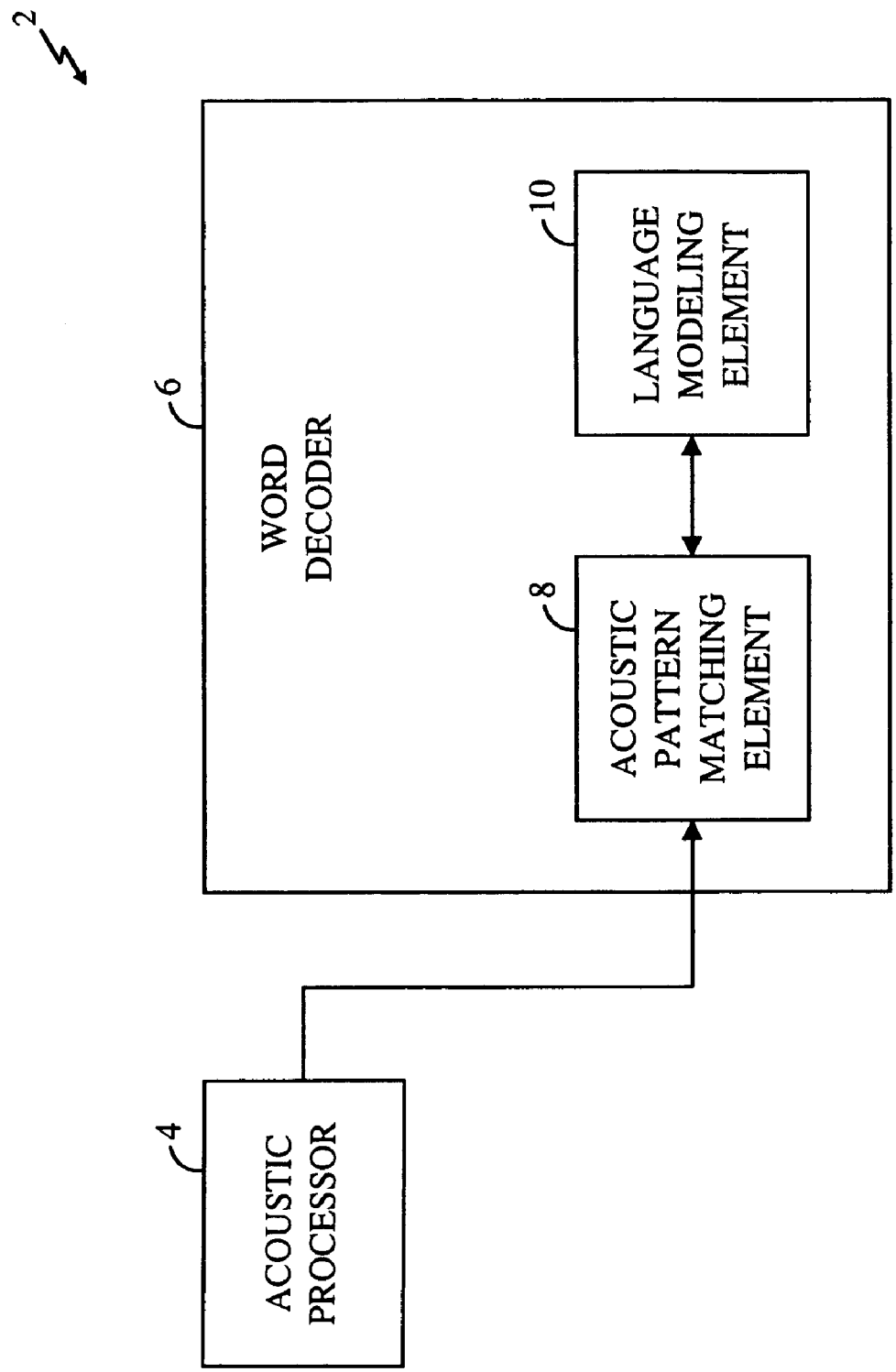
FIG. 1 shows a voice recognition system including an Acoustic Processor and a Word Decoder in accordance with one aspect.

FIG. 1 illustrates a simplified drawing of a VR system 2 including an acoustic processor 4 and a word decoder 6 in accordance with an exemplary aspect of the current system. The word decoder 6 includes an acoustic pattern matching element 8 and a language modeling element 10. The language modeling element 10 is also known by some in the art as a grammar specification element. The acoustic processor 4 is coupled to the acoustic matching element 8 of the word decoder 6. The acoustic pattern matching element 8 is coupled to a language modeling element 10.

The acoustic processor 4 extracts features from an input speech signal and provides those features to word decoder 6. In general, the word decoder 6 translates the acoustic features received from the acoustic processor 4 into an estimate of the speaker's original word string. The estimate is created via acoustic pattern matching and language modeling. Language modeling may be omitted in certain situations, such as applications of isolated word recognition. The acoustic pattern matching element 8 detects and classifies possible acoustic patterns, such as phonemes, syllables, words, and so forth. The acoustic pattern matching element 8 provides candidate patterns to language modeling element 10, which models syntactic constraint rules to determine gramatically well formed and meaningful word sequences. Syntactic information can be employed in VR when acoustic information alone is ambiguous. The VR system 2 sequentially interprets acoustic feature matching results and provides the estimated word string based on language modeling.

Both the acoustic pattern matching and language modeling in the word decoder 6 employ deterministic or stochastic modeling to describe the speaker's phonological and acoustic-phonetic variations. VR system performance is related to the quality of pattern matching and language modeling. Two commonly used models for acoustic pattern matching known by those skilled in the art are template-based dynamic time warping (DTW) and stochastic hidden Markov modeling (HMM).

The acoustic processor 4 represents a front end speech analysis subsystem of the VR system 2. In response to an input speech signal, the acoustic processor 4 provides an appropriate representation to characterize the time varying speech signal. The acoustic processor 4 may discard irrelevant information such as background noise, channel distortion, speaker characteristics, and manner of speaking.

Combining multiple VR systems, or VR engines, provides enhanced accuracy and uses a greater amount of information from the input speech signal than a single VR system. One system for combining VR engines is described in U.S. patent application Ser. No. 09/618,177, entitled "Combined Engine System and Method for Voice Recognition," filed Jul. 18, 2000, and U.S. patent application Ser. No. 09/657,760, entitled "System and Method for Automatic Voice Recognition Using Mapping," filed Sep. 8, 2000, assigned to the assignee of the present application.

In one aspect of the present system, multiple VR engines may be combined into a distributed VR system. The multiple VR engines provide a VR engine at both a subscriber station and the network server. The VR engine on the subscriber station is called the local VR engine, while the VR engine on the network server is called the network VR engine. The local VR engine comprises a processor for executing the local VR engine and a memory for storing speech information. The network VR engine comprises a processor for executing the network VR engine and a memory for storing speech information.

One example of a distributed VR system is disclosed in U.S. patent application Ser. No. 09/755,651, entitled "System and Method for Improving Voice Recognition in a Distributed Voice Recognition System," filed Jan. 5, 2001, assigned to the assignee of the present invention.

Figure 2:
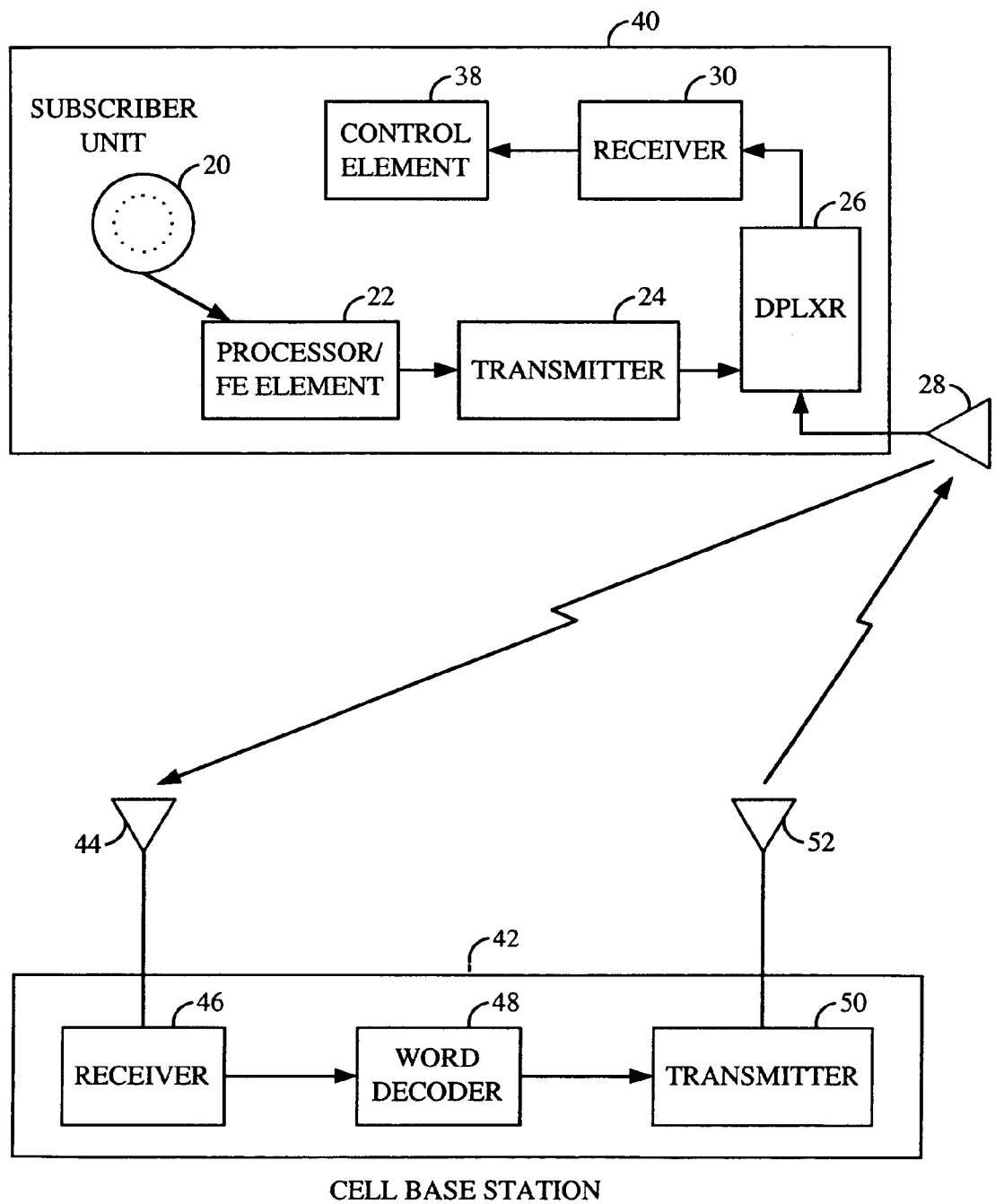
FIG. 2 shows an exemplary aspect of a distributed voice recognition system.

FIG. 2 shows one aspect of the present invention. In FIG. 2, the environment is a wireless communication system comprising a subscriber station 40 and a base station 42. In this aspect, the distributed VR includes an acoustic processor or feature extraction element 22 residing in a subscriber unit 40 and a word decoder 48 residing in the base station. Because of the high computation costs associated with voice recognition implemented solely on a subscriber unit, voice recognition in a non-distributed voice recognition system for even a medium size vocabulary would be highly infeasible. If VR resides solely at the base station or on a remote network, accuracy may be decreased dramatically due to degradation of speech signals associated with speech codec and channel effects. Such a distributed system results generally in reduction in cost of the subscriber unit resulting from the absence of word decoder hardware, and reduction of subscriber unit battery drain associated with local performance of the computationally intensive word decoder operation. A distributed system improves recognition accuracy in addition to providing flexibility and extensibility of the voice recognition functionality.

Speech is provided to microphone 20, which converts the speech signal into electrical signals and provided to feature extraction element 22. Signals from microphone 20 may be analog or digital. If analog, an A/D converter (not shown in this view) may be interposed between microphone 20 and feature extraction element 22. Speech signals are provided to feature extraction element 22, which extracts relevant characteristics of the input speech used to decode the linguistic interpretation of the input speech. One example of characteristics used to estimate speech is the frequency characteristics of an input speech frame. Input speech frame characteristics are frequently employed as linear predictive coding parameters of the input speech frame. The extracted speech features are then provided to transmitter 24 which codes, modulates, and amplifies the extracted feature signal and provides the features through duplexer 26 to antenna 28, where the speech features are transmitted to base station 42. Various types of digital coding, modulation, and transmission schemes known in the art may be employed by the transmitter 24.

At base station 42, the transmitted features are received at antenna 44 and provided to receiver 46. Receiver 46 may perform the functions of demodulating and decoding received transmitted features, and receiver 46 provides these features to word decoder 48. Word decoder 48 determines a linguistic estimate of the speech from the speech features and provides an action signal to transmitter 50. Transmitter 50 amplifies, modulates, and codes the action signal, and provides the amplified signal to antenna 52. Antenna 52 transmits the estimated words or a command signal to subscriber station 40. Transmitter 50 may also employ digital coding, modulation, or transmission techniques known in the art.

At subscriber station 40, the estimated words or command signals are received at antenna 28, which provides the received signal through duplexer 26 to receiver 30 which demodulates and decodes the signal and provides command signal or estimated words to control element 38. In response to the received command signal or estimated words, control element 38 provides the intended response, such as dialing a phone number, providing information to a display screen on the portable phone, and so forth.

The information sent from base station 42 need not be an interpretation of the transmitted speech, but may instead be a response to the decoded message sent by the portable phone. For example, one may inquire about messages on a remote answering machine coupled via a communications network to base station 42, in which case the signal transmitted from the base station 42 to subscriber unit 40 may be the messages from the answering machine. A second control element for controlling the data, such as the answering machine messages, may also be located in the central communications center.

Transmission time between the subscriber station 40 and the base station 42 is partitioned into time units. In one aspect of the present system, the transmission time may be partitioned into frames. In another aspect, the transmission time may be partitioned into time slots. In accordance with one aspect, the system, specifically the subscriber station 40 or the base station 42, partitions data into data packets and transmits each data packet over one or more time units. At each time unit, the base station 42 can direct data transmission to any subscriber unit 40 within the cell that is in communication with the base station 42. In one aspect, frames may be further partitioned into a plurality of time slots. In yet another aspect, time slots may be further partitioned, such as into half-slots and quarter-slots.

Figure 3:
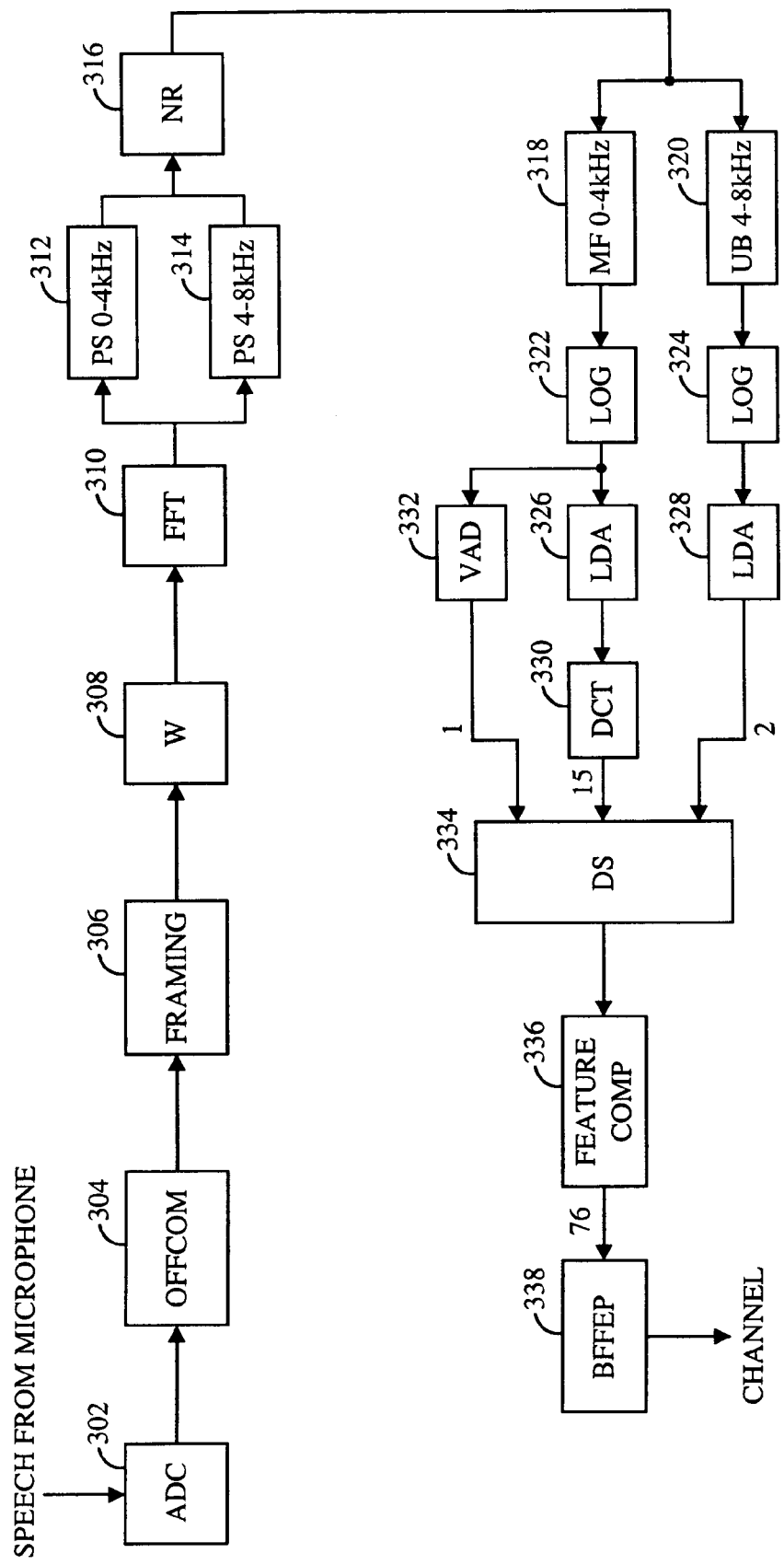
FIG. 3 illustrates subscriber station processing including high frequency speech components.

Subscriber Station. FIG. 3 illustrates a subscriber station or terminal side VR system 300 in accordance with one aspect of the present invention. Speech is provided to a microphone (not shown), that converts speech into an analog electrical signal. The analog electrical signal is provided to an analog-to-digital converter (ADC) 302. The ADC 302 provides a digital signal at sampling rates of 8 kHz, 11 kHz, or 16 kHz. One of ordinary skill in the art understands that other sampling rates may be employed, but these rates generally provide good performance for most speech signals encountered. To remove direct current (DC) offset, the digital signal is provided to an offset compensator (OC) 304. In one aspect, the OC 304 comprises a high-pass filter that provides a signal free of DC offset, $x_{of}$, where:

$$x_{of}(n) = x_{in}(n) - x_{in}(n-1) + \alpha_{of} * x_{of}(n-1) \quad (1)$$

where: $x_{in}(n)$ is a sample of digital signal at frame n, of $\alpha_{of} = 1.0 - 0.05*(8000/f_s)$, and $f_s$ is the sampling frequency of the ADC 302, namely 8, 11, or 16 kHz in the aspect shown.

The OC 304 provides the offset-free signal $x_{of}$ to a framing block 306. Framing block 306 divides the offset-free signal $x_{of}$ into multiple overlapping frames, each frame comprising N samples. The frame shift interval M is the number of samples between the starting points of consecutive frames. M determines number of frames per unit of time. For all sampling rates, the frame length may be 25 ms. In the case of 11 kHz sampling rate the signal is linearly interpolated to 16 kHz after framing. For the 8, 11, and 16 kHz sampling rates, the values of parameters N and M are given in Table 1.

TABLE 1

| SamplingRate (kHz) | f = 16 | f = 11 | f = 8 |
| --- | --- | --- | --- |
| Frame Length N (samples) | 400 | 400 | 200 |
| Shift Interval M (samples) | 160 | 160 | 80 |

In operation, for a sampling rate of 16 kHz, the received signal is divided into overlapping frames each containing 400 samples. A first frame comprises samples 0 through 399, while the second frame is offset by 160 samples, and thus comprises samples 160 through 559, and so forth. Each 400 sample frame is 25 ms long.

Windowing block 308 windows the data received from the framing block 306. In one aspect, windowing block 308 employs a Hamming window function according to the following equation:

$$x_w(n) = \left\{0.54 - 0.46 \cdot \cos\left(\frac{2\pi(n-1)}{N-1}\right)\right\} * x_{of}(n), 1 \le n \le N \quad (2)$$

where: $x_w(n)$ represents the output of the windowing block 308.

The windowed frame is then provided to a fast Fourier transform (FFT) module 310, which computes a magnitude spectrum for each of the frames. First, a FFT is performed in accordance with the following equation:

$$|X_k| = \left| \sum_{n=0}^{FFTL-1} x_w(n) e^{-jnk\frac{2\pi}{FFTL}} \right|, k = 0, \ldots, FFTL-1. \quad (3)$$

where $|X_k|$ is the magnitude of the complex vector resulting from the FFT module 310, and FFTL is the block length. For the 8 kHz sampling frequency, the FFTL is 256. Because the 8 kHz frame comprises only N=200 samples, the windowed speech signal $x_w$ is padded with zero-valued samples for the (FFTL_N) samples to arrive at the length of the FFTL. After the FFT is performed, the first 129 values of $|X_k|$ are retained for further processing. Similarly, for the 11 kHz and the 16 kHz frames, whose frames comprise N=400 samples, an FFTL of 512 is used. The windowed speech signal $x_w$ is padded with zero-valued samples for the (FFTL_N) samples to arrive at the length of the FFTL. After the FFT is performed, the first 257 values of $|X_k|$ are retained for further processing.

Lower frequency power spectrum computation block 312 and higher frequency power spectrum computation block 314 compute a power spectrum, $|X_k|^2$, by taking the square of the magnitude spectrum $|X_k|$. In order to efficiently utilize the processing blocks, the first 129 values of the magnitude spectrum $|X_k|$ for all sampling rates, representing a frequency range 0 to 4 kHz are provided to the lower frequency power spectrum computation block 312. If the subscriber station or terminal employs a sampling rate higher than 8 kHz, the high frequency information in the frequency range above 4 kHz is added as follows.

For the 11 kHz sampling rate, the magnitude values $|X_{129}|$ through $|X_{176}|$ comprise the information for the frequency range 4 kHz to 5.5 kHz. The magnitude values $|X_{129}|$ through $|X_{176}|$ are provided to the higher frequency power spectrum computation block 314 that calculates a single power value for this frequency range according to the following equation:

$$E_0 = \sum_{k=129}^{176} |X_k|^2 \quad (4)$$

For the 16 kHz sampling rate, the magnitude values $|X_{177}|$ through $|X_{256}|$ comprise the information for the frequency range 5.5 kHz to 8 kHz. The magnitude values $|X_{29}|$ through $|X_{256}|$ are provided to the higher frequency power spectrum computation block 314, and the higher frequency power spectrum computation block 314 calculates a power value for the frequency range 4 kHz to 5.5 kHz in accordance with Equation (3) and another power value for the frequency range 5.5 kHz to 8 kHz as follows:

$$E_1 = \sum_{k=177}^{256} |X_k|^2 \quad (4)$$

The $E_0$ and $E_1$ results of equations 3 and 4 are scalar values that are concatenated onto the 129 point vector from the 0–4 kHz part of the signal. The size of the spectral vector provided to noise compensation block 316 is 129, 130, and 131 for sampling rates 8, 11, and 16 kHz.

Noise compensation block 316 performs a noise power spectrum estimate based on the signal received using a first order recursion scheme and applies noise reduction to the signal. For the noise power spectrum estimate, k is the frequency bin index, n is the frame number, $|X(k,n)|^2$ is the power spectrum of the noisy speech, and $|\hat{N}(k,n)|^2$ is the estimated power spectrum of the noise. When the frame index n is equal to zero, the noise power estimate $|\hat{N}(k,n)|^2$ is:

$$log(|\hat{N}(k,n)|^2) = log(1+|X(k,n)|^2) \quad (5)$$

When n is greater than zero, the noise power estimate $|\hat{N}(k,n)|^2$ is $$log(|\hat{N}(k,n)|^2) = log(|\hat{N}(k,n-1)|^2) + \alpha^*(log(1+|X(k,n)|^2) - log(|\hat{N}(k,n-1)|^2)) \quad (6)$$

where:

$$\alpha(k,n) = \frac{1}{n+1}, \text{ for } n < 15 \quad (7)$$

$\alpha(k,n) = 0.01$, for $FrameEnergy_n < 2^*NoiseEnergy_{n-1}$, and $\alpha(k,n) = 0$, otherwise. $\quad (8)$ $$\text{where: } FrameEnergy_n = \sum_{k=0}^{128} |X(k,n)|^2 \quad (9)$$

$$\text{and: } NoiseEnergy_n = \sum_{k=0}^{128} |\hat{N}(k,n)|^2 \quad (10)$$

Once noise compensation block 316 has estimated the noise power spectrum $|\hat{N}(k,n)|^2$, noise compensation block 316 filters the noise power spectrum in the power spectral domain using the following filter, which is a generalized form of Wiener filtering:

$$|H_r(k,n)|^2 = \max\left(\left(\frac{|X(k,n)|^2 - \gamma * |\hat{N}(k,n)|^2}{|X(k,n)|^2}\right)^2, \beta\right) \quad (11)$$

In Equation (11), $\beta$ is a spectral floor parameter, used to avoid negative or very small transfer function components. In one embodiment, $\beta=0.01$. $\gamma$ is a noise overestimation factor, enabling subtraction from the noisy speech spectrum of more than the estimated noise power spectrum $|\hat{N}(k,n)|^2$. The overestimation is determined in accordance with a posterior signal-to-noise ratio (Posterior SNR). Posterior SNR may be computed as follows:

$$PosteriorSNR_n = 10 * \log 10 * \left(\frac{FrameEnergy_n}{NoiseEnergy_n}\right) \quad (12)$$

where FrameEnergy and NoiseEnergy are as calculated in the noise spectrum power estimate above. In one aspect, $\gamma$ may be calculated as follows:

$$\gamma = \frac{-1.875}{20} * PosteriorSNR_n + 3.125 \quad (13)$$

Figure 4:
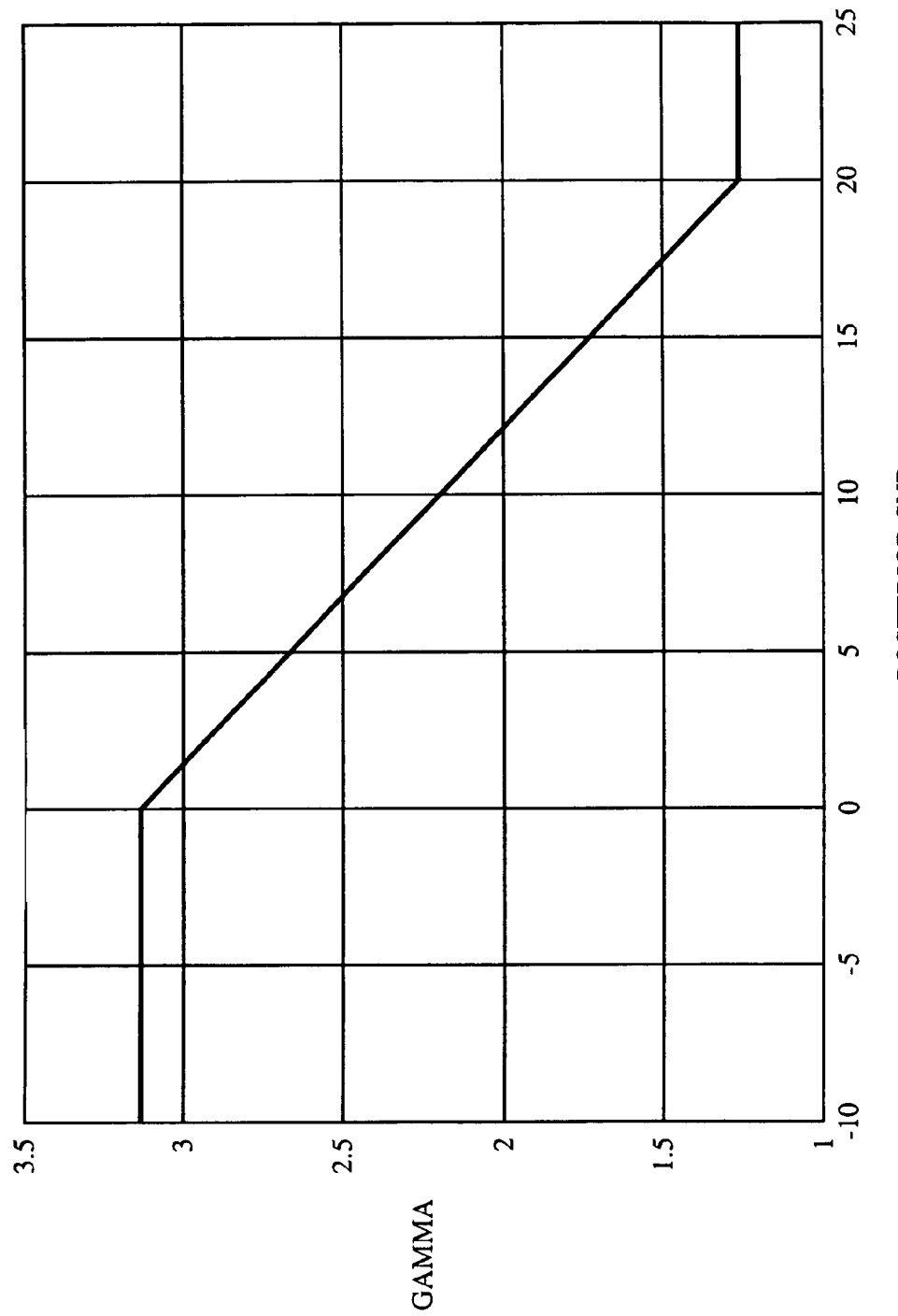
FIG. 4 is a graph of posterior SNR dependent overestimation factor used in noise compression.

FIG. 4 illustrates values of $\gamma$ based on Posterior SNR. From FIG. 4, $\gamma$ is constant at 3.125 when Posterior SNR is below 0 dB, and is constant at 1.25 when Posterior SNR is above 20 dB. $\gamma$ varies linearly from 0 dB to 20 dB. As a result, more noise is subtracted at low Posterior SNR.

To reduce undesirable effects associated with power spectrum estimates, the noise compensation block 316 smoothes the raw filter transfer function $|H_r(k,n)|^2$ in both the time and frequency domains. Smoothing in both time and frequency domains is required because no true estimates of the noise in the time and frequency bands are available at this point. In one aspect, time domain smoothing initially uses a first-order recursion of $|H_r(k,n)|^2$ to produce smoothed filter $|H_s(k,n)|^2$ according to the following equation:

$$|H_s(k,n)|^2 = \alpha_{filter} * |H_s(k,n-1)|^2 + (1-\alpha_{filter}) * |H_r(k,n)|^2 \quad (14)$$

where $\alpha_{filter}$ is a filter smoothing constant. In one aspect $\alpha_{filter}$ is 0.9. The final time-domain smoothed filter transfer function is obtained in one aspect as an average of the raw and the smoothed filter transfer function as follows:

$$|H_{s2}(k,n)|^2 = |H_r(k,n)|^2 * |H_s(k,n+lat)|^2 + |H_s(k,n+lat)|^2 * (1-|H_s(k,n+lat)|^2) \quad (15)$$

where lat is latency compensation. The initial smoothing given by Equation (14) introduced a group delay; consequently, the smoothed filter transfer function $|H_{s2}(k,n)|^2$ is not synchronized with the raw filter transfer function $|H_r(k,n)|^2$. To reestablish the synchronization, the latency compensation lat is used. In one aspect the lat is 2, indicating a two frame buffer is employed in association with Equation (15).

The time domain filtered transfer function is used for filtering the spectral content of the frequency range higher than 4 kHz. The final filter transfer function for filtering the spectral content of the frequency range 0 to 4 kHz is obtained by filtering the time domain filtered transfer function in the frequency domain with a sliding window rectangular filter as follows:

$$|H(k,n)|^2 = \frac{1}{2*L+1} * \sum_{i=-L}^{L} |H_{s2}(j,n)|^2 \quad (16)$$

where L is a length of the sliding window. In one aspect L is 10. Further, frequency domain smoothing according to Equation (16) may be applied only to a certain number of power spectral bins, such as 129 bins.

$|H(k,n)|^2$ is then applied to filter the noisy power spectra as follows:

$$|\hat{Y}(k,n)|^2 = \max(|X(k,n)|^2 * |H(k,n)|^2, \beta_{filter} * |\hat{N}(k,n)|^2) \quad (17)$$

where $\beta_{filter}$ is a noise floor, comprising a fraction of the estimated noise spectrum $|\hat{N}(k,n)|^2$. In one aspect $\beta_{filter}=0.001$. The resultant vector, $|\hat{Y}(k,n)|^2$, is an estimate of the clean speech power spectra. Hence noise compensation block 316 receives the 129, 130, or 131 bin power spectra $|X(k,n)|^2$, creates a noise power estimate $|\hat{N}(k,n)|^2$, and filters the noise from the power spectra $|X(k,n)|^2$ to create a clean speech power spectra $|\hat{Y}(k,n)|^2$.

The clean speech power spectra $|\hat{Y}(k,n)|^2$ is filtered using Mel filtering for the 0 to 4 kHz components or using Upper Band (UB) filtering for the 4 to 8 kHz components of the 11 and 16 kHz signals. Mel filtering block 318 uses a specific frequency range to compute a Mel-warped spectrum. In one aspect, Mel filtering block 318 uses the 64 to 4000 Hz frequency range to compute the Mel-warped spectrum. This range may be divided into 23 channels equidistant in the Mel frequency scale, with each channel having a triangular-shaped frequency window. In this arrangement, consecutive channels are half-overlapping. For x having a range from 64 Hz to 4000 Hz, the Mel-warped spectrum is:

$$Mel(x) = 2595 * \log_{10}(1 + x/700) \quad (18)$$

The center frequency $fc_i$ of filter i and the FFT bin $cbin_i$ corresponding to this center frequency are given by:

$$fc_i = Mel^{-1}\left(Mel(64) + i * \frac{Mel(4000) - Mel(64)}{23 + 1}\right), i = 1, \ldots, 23 \quad (19)$$

$$cbin_i = \text{round}(fc_i * 256/8000) \quad (20)$$

The output of the Mel filter is the weighted sum of the power spectrum values $(|\hat{Y}(k,n)|^2)$ in each band. Mel filtering block 318 uses triangular, half-overlapped windowing based on the received clean speech power spectra $|\hat{Y}(k,n)|^2$ according to the following equation:

$$fbank_i = \sum_{k=cbin_{i-1}}^{cbin_i} \frac{k - cbin_{i-1}}{cbin_i - cbin_{i-1}} |\hat{Y}(k)|^2 + \sum_{k=cbin_i+1}^{cbin_{i+1}} \frac{cbin_{i+1} - k}{cbin_{i+1} - cbin_i} |\hat{Y}(k)|^2 \quad (21)$$

where, i=1, ..., 23. $cbin_0$ and $cbin_{24}$ are the FFT bin indices corresponding to a starting frequency of 64 Hz and a final frequency of 4000 Hz for a 23 channel Mel frequency scale. $cbin_0$ and $cbin_{24}$ may be computed as follows:

$$cbin_0 = \text{round}(64*256/8000) = 2 \tag{22}$$

$$cbin_{24} = 128 \tag{23}$$

For the 11 kHz and 16 kHz sampling rates, Mel filtering block 318 only uses the 64 Hz to 4000 Hz range for Mel filtering. Use of this limited range facilitates using subsequent storage intensive components of the front-end algorithm designed for the 8 kHz sampling rate, such as VAD and Vector Quantization table. Further, the Mel filtering block's use of the 64 Hz to 4000 Hz range allows using server post-processing techniques designed for the 11 kHz and 16 kHz sampling rate.

Upper band frequency block 320 selects the two power values $E_0$ and $E_1$ from the clean speech power spectra $|\hat{Y}(k,n)|^2$ for further processing. Lower frequency natural logarithm block 322 applies a natural logarithm function to the outputs $fbank_j$ of the Mel filterbank, while higher frequency natural logarithm block 324 applies a natural logarithm function to the power values $E_0$ and $E_1$. For lower frequency natural logarithm block 322, $$f_i = \ln(fbank_i), i=1, \ldots, 23 \tag{24}$$

For higher frequency natural logarithm block 324, $$e_i = \ln(Eclean_i), i=0,1 \tag{25}$$

where $Eclean_i$ are the upper band energies $E_0$ and $E_1$ after noise compensation.

Figure 5:
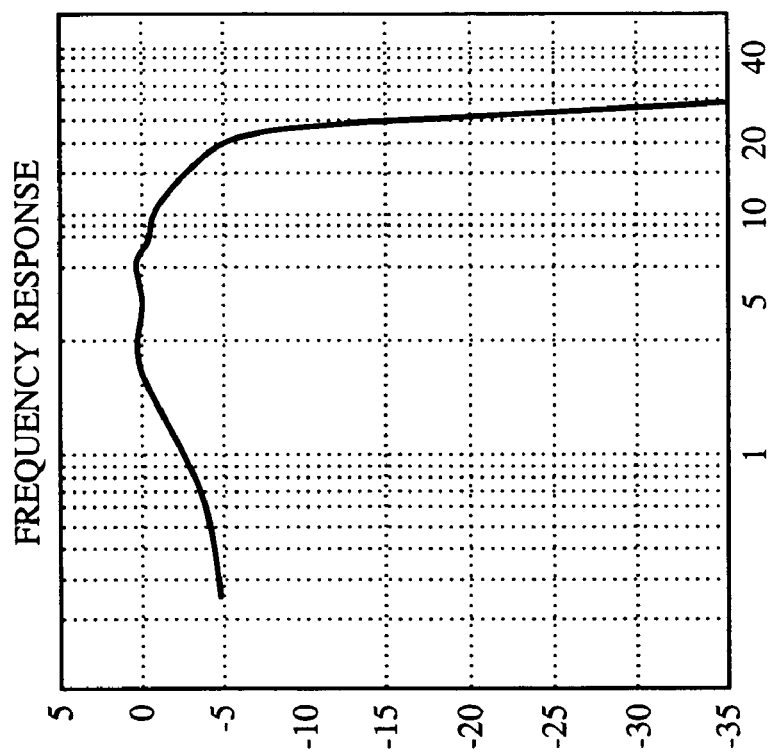
FIG. 5 shows characteristics of the linear discriminant analysis filter and its associated frequency response.
Figure 5:
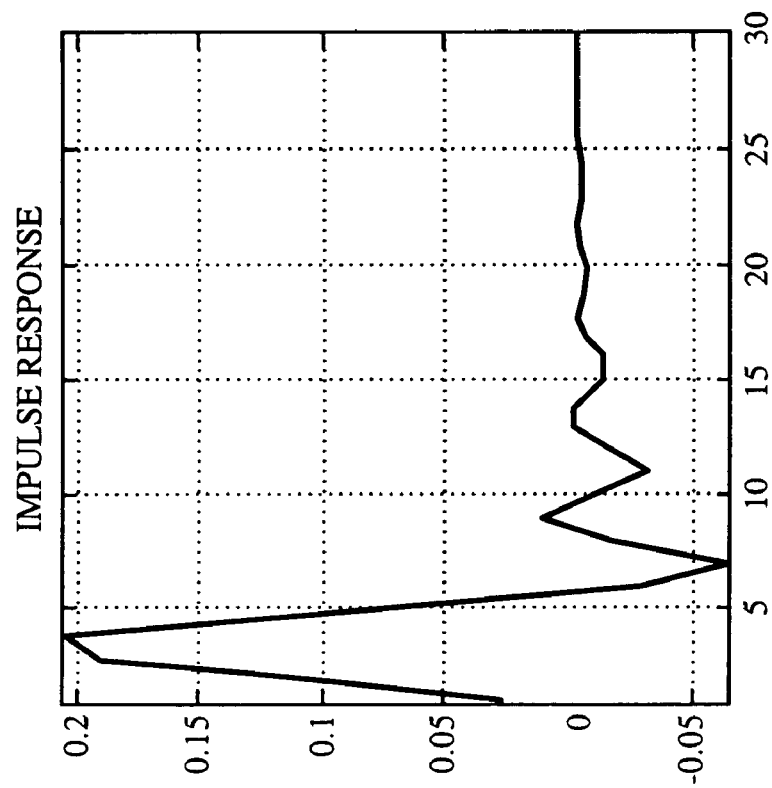

Time trajectories for each of the 23 channels, as well as the two upper band energies are filtered using RASTA-LDA filters 326 and 328. The RASTA-LDA filters 326 and 328 may be FIR filters where filter coefficients are derived using the linear discriminant analysis (LDA) technique on a phonetically labeled database. One such phonetically labeled database that may be employed is the phonetically labeled OGI-Stories database known in the art. The OGI-Stories database may be augmented with certain acoustic aspects, such as automobile noise or other commonly encountered noises. Automobile noise at, for example, 10 dB SNR may be artificially added to the OGI-Stories database for the RASTA-LDA filters 326 and 328. Noisy OGI-Stories files are cleaned using the noise compensation technique outlined above for noise compensation block 316. RASTA-LDA filters 326 and 328 compute twenty three logarithmic Mel filter-bank energies from the cleaned speech files every 10 ms using a 25 ms speech segment. RASTA-LDA filters 326 and 328 use a 101-point feature vector from the seventh Mel band. Each 101-point feature vector contains 50 points in the past and 50 points in the future and is labeled by the phone label of the center point of the vector. Each of the forty one phones is represented uniformly by three states for a total of 123 states and each state is used as a class. The leading discriminant vector from the seventh band is used as a temporal RASTA filter. One example of a RASTA filter that may be used in this instance in accordance with RASTA-LDA filters 326 and 328 is described in U.S. Pat. No. 5,450,522 entitled, "Auditory Model for Parameterization of Speech" filed Sep. 12, 1995. The filter is truncated to a 51 point causal filter to reduce latency. Finally, the filter is convolved with a low-pass filter with a cut-off modulation frequency of 25 Hz and further truncated to 30 points. The resultant LDA filter used for both RASTA-LDA filter 326 and 328 has a 20 ms delay at 5 Hz modulation frequency and its response is illustrated in FIG. 5. The resultant filtered two element vector for higher frequencies from RASTA-LDA filter 328 is $e_j$, while the resultant filtered 23 element vector for lower frequencies from RASTA-LDA filter 326 is $f_j$.

DCT block 330 computes 15 cepstral coefficients from the RASTA-LDA filtered log energies of the 23 channels transmitted from LDA filter 326. Cepstral coefficients $c_i$ are computed according to the following equation:

$$c_i = \sum_{j=1}^{23} f_j * \cos\left(\frac{\pi * i}{23}(j - 0.5)\right), 0 \leq i \leq 14 \tag{26}$$

The VAD 332 is a single hidden layer feed forward multiplayer perceptron, or neural network. The VAD 332 discriminates between speech and nonspeech frames. The VAD 332 performs training offline using a backpropagation algorithm and a noisy database. Further information regarding backpropagation algorithms may be found in Bourlard and Morgan, "Connectionist Speech Recognition," Kluwer Academic Publishers (1994), at Chapter 4. The VAD 332 may use six cepstral coefficients computed from low-pass filtered log-energies of the 23 Mel filters. The low-pass filter employed here by the VAD 332 used here is:

$$c'_i(n) = 0.5*c_i(n) + 0.5*c'_i(n-1) \tag{27}$$

where $c'_i$ is the output of the low-pass filter and $c_i$ the input to the low-pass filter. The VAD 332 is a neural network that may employ 54 input units, 50 hidden units and one output. The inputs to the neural network may include nine frames of the six cepstral coefficients. The VAD 332 may be trained using two outputs, one for the speech class and one for the silence class. The output of the trained VAD 332 can provide an estimate of the posterior probability of the current frame being speech or silence. During testing only the output corresponding to the silence class is used. VAD 332 computes silence and nonsilence coefficients $y_n(sil)$ and $y_n(nosil)$ as follows:

$$y_n(sil) = \sum_{k=0}^{49} w_{k,sil}^2 sigm\left(\sum_{j=0}^{5}\sum_{i=-4}^{4} w_{i,j,k}^1 c_j(n+1)\right) \tag{28}$$

$$y_n(nosil) = \sum_{k=0}^{49} w_{k,nosil}^2 sigm\left(\sum_{j=0}^{5}\sum_{i=-4}^{4} w_{i,j,k}^1 c_j(n+1)\right) \tag{29}$$

where $c_j(n)$ is the $j^{th}$ order cepstral coefficient at frame n.

$w_{i,j,k}^1$ is the weight of the first VAD MLP layer associated with hidden unit k, cepstral coefficient j and frame n+i.

$w_{k,sil}^2$ and $w_{k,nosil}^2$ are the weights between hidden unit k and the silence and speech output units respectively. The function sigm is the sigmoid function:

$$sigm(x) = \frac{1}{1+e^{-x}} \quad (30)$$

The probability that the frame n is silence is given by:

$$p_n(sil) = \frac{e^{y_n(sil)}}{e^{y_n(sil)} + e^{y_n(nosil)}} \quad (31)$$

where $p_n(sil)$ is the probability of frame n being silence.

Downsampler 334 combines the single probability of silence, $p_n(Sil)$ from VAD 332 with the 15 cepstral coefficients from DCT block 330 and the two upper band values from RASTA-LDA filter 328. Downsampler 334 downsamples the cepstral coefficients, the upper band values, and the probability of silence by a factor of two in time, i.e. every alternate frame in time. The final feature vector transmitted by the downsampler 334 thus includes 18 parameters, including the 15 cepstral coefficients, the silence probability, and the two upper band energy based features. In the case of the 8 kHz sampling rate, the two energy based features are set to zero and ignored during server processing, described in detail below. For the 11 kHz sampling rate, the second energy based feature is set to zero.

Feature compressor 336 receives the 18 element vector and compresses the vector using a split Vector Quantization (VQ) algorithm. VQ uses a Linde-Buzo-Gray algorithm, or LBG algorithm, known in the art to train the codebook. The feature compressor 336 initializes the codebook with the mean value of all training data. At each training step, the feature compressor 336 may divide each centroid into two parts and may re-estimate the centroid values. The feature compressor 336 performs splitting in the positive and negative direction of standard deviation divided by 0.2. The form of the 17 element codebook employed is shown in Table 2.

TABLE 2

Split Vector Quantization Feature Pairings and Bit Allocation

| Codebook | No. of bits | Size | Element 1 | Element 2 |
|---|---|---|---|---|
| $Q^0$ | 7 | 128 | $P_n(sil)$ | — |
| $Q^1$ | 7 | 128 | $C_0$ | — |
| $Q^2$ | 7 | 128 | $C_1$ | — |
| $Q^3$ | 6 | 64 | $C_2$ | — |
| $Q^4$ | 5 | 32 | $C_3$ | — |
| $Q^5$ | 5 | 32 | $C_4$ | — |
| $Q^{6,7}$ | 5 | 64 | $C_5$ | $C_6$ |
| $Q^{8,9}$ | 5 | 64 | $C_7$ | $C_8$ |
| $Q^{10,11}$ | 5 | 64 | $C_9$ | $C_{10}$ |
| $Q^{12,13}$ | 5 | 64 | $C_{11}$ | $C_{12}$ |
| $Q^{14,15}$ | 5 | 64 | $C_{13}$ | $C_{14}$ |
| $Q^{16}$ | 7 | 128 | $E_0$ | — |
| $Q^{17}$ | 7 | 128 | $E_1$ | — |

From Table 2, Element 1 and Element 2 represent the values received from the downsampler 334. Codebook element $^0$ has 128 levels. If the value $P_n(sil)$ received is 0.5, for example, the feature compressor 336 computes the closest entry of the 128 entries to that value, for example entry 17. The binary equivalent of this entry 17 is transmitted by the feature compressor 336, using the seven bits available, such as 0010001 for 17. The feature compressor 336 finds the closest VQ centroid using the Euclidean distance, with the weight matrix set to the identity matrix. 76 bits describe one frame after packing the aforementioned indices.

The 76 bits are packed and transmitted from the subscriber station to the network server according to a standard frame structure. One common example of frame structure is defined in ETSI ES 201 108 v1.1.2, "Distributed Speech Recognition; Front-end Feature Extraction Algorithm; Compression Algorithm", April 2000 ("the ETSI document"). The ETSI document discusses the multiframe format, the synchronization sequence, and the header field.

Previous systems used cyclic redundancy code to detect errors in a pair of adjacent frames of transmitted features. Such systems also compared the two sets of received vectors to determine whether the recieved frames are in error. One common example of error detection is defined in ETSI ES 201 108 v1.1.2, "Distributed Speech Recognition; Front-end Feature Extraction Algorithm; Compression Algorithm", April 2000 ("the ETSI document"). The ETSI document discusses the error detection using CRC and a heuristic algorithm to compare the parameters of recived pair of vectors. Such an implementation prohibits the use of CRC for both error detection and correction because a large number of bits are required for error correction, making the bandwidth requirement large. Downsampler 334 allows the packing of information corresponding to two frames of features into the available bits with more bits for error detection and correction. The present design employs a cyclic redundancy check mechanism in the bitstream formatter, framer, and error protector (BFFEP) 338 to enable single frame transmission and checking of received information.

Each of the foregoing 18 codebook elements form a frame, and each 20 ms frame from the subscriber station is transmitted using the 18 codebook elements. The indices for a single frame are formatted according to FIG. 6a. From FIG. 6, five bit vector element $Q^{14,15}$ is transmitted first, followed by five bit vector element $Q^{12,13}$, and so forth, through seven bit vector element $Q^{17}$. The 76 bits of data shown in FIG. 6a are protected with 16 bits of cyclic forward error correction code using the following equation:

$$g(X) = 1 + X^2 + X^5 + X^{11} + X^{13} + X^{16}. \quad (32)$$

Figure 12:
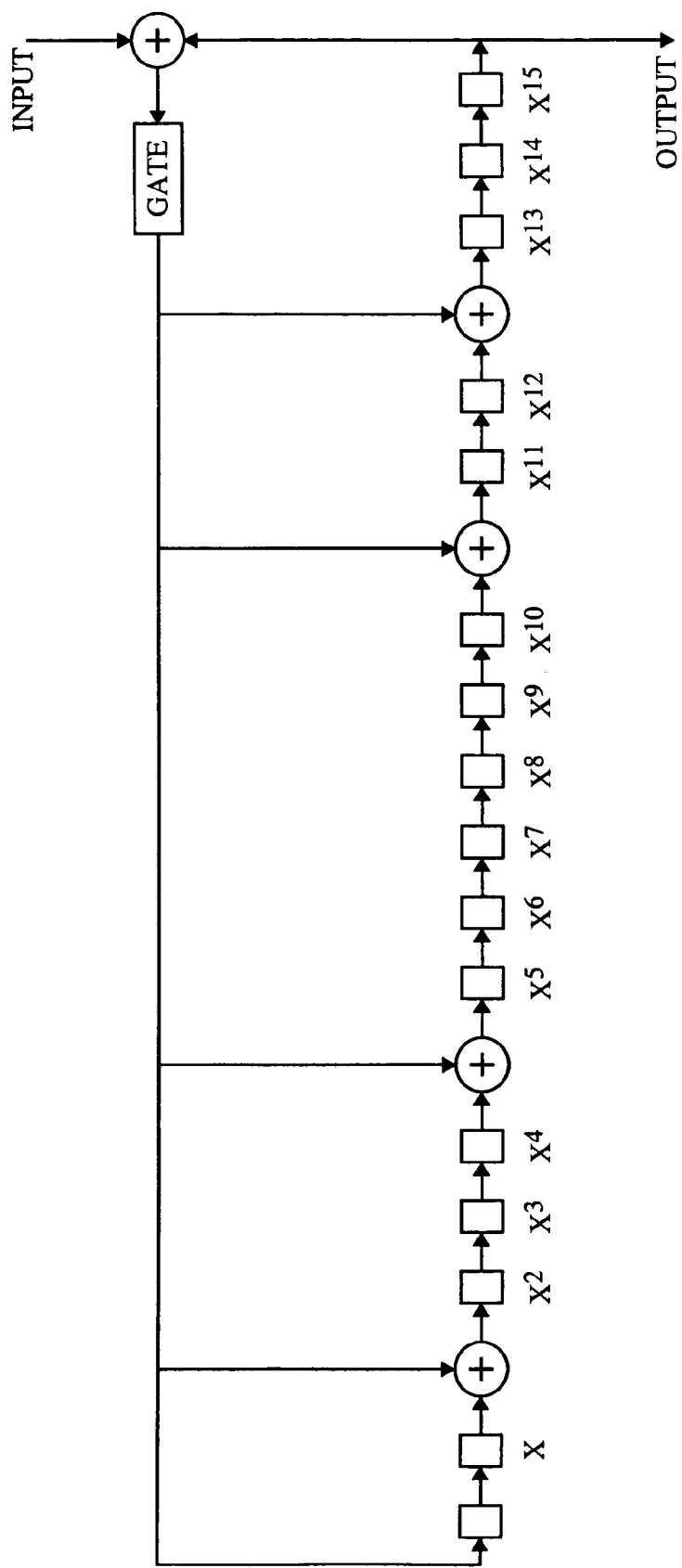
FIG. 12 presents computation of the g(x) function used in accordance with the CRC transmission aspects of the design.

FIG. 12 illustrates a Fire code g(X) calculator according to Equation (32). Further information relating to derivation of this Fire code calculator may be found in Peterson and Weldon, Jr., "Error-Correcting Codes," (Second Edition, 1988), at Chapter 11.

Figure 6A:
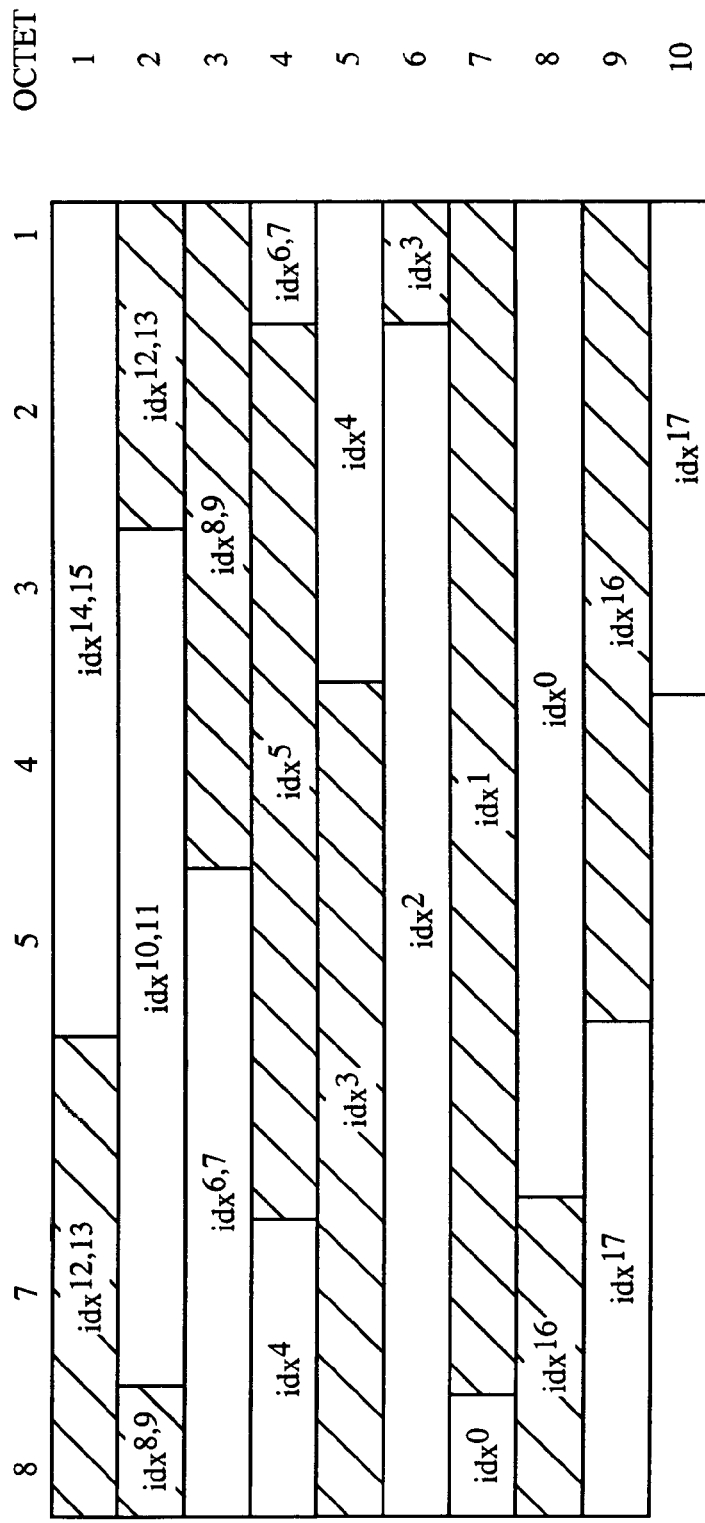
FIG. 6a shows frame information for the mth frame transmitted by the subsciber unit.
Figure 6B:
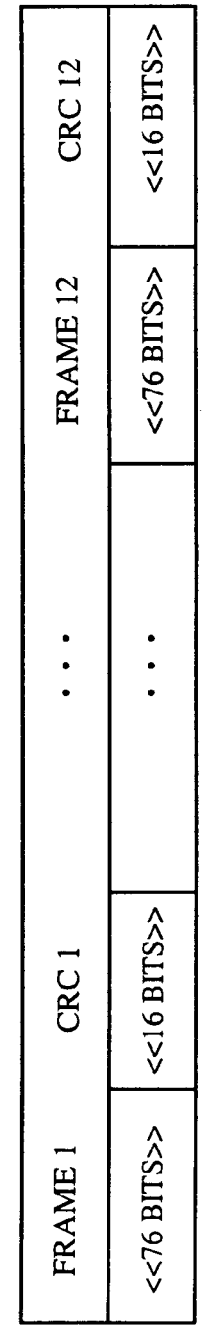
FIG. 6b is the CRC protected packet stream.

This 16 bit CRC together with the aforementioned indices of FIG. 6a form a 92 point vector that is split into 11.5 octets, or 11.5 eight element packets. Twelve 11.5 octet packets are combined to form a 138 octet stream having the format shown in FIG. 6b. The BFFEP 338 combines the feature stream with the overhead, specifically the synchronization sequence and the header. All trailing frames within a final multiframe that contain no valid speech data, such as the end of a conversation, are set to zero and transmitted by the BFFEP 338. The resulting format may be transmitted by the BFFEP at a data rate of 4800 bits per second.

Network Server. The bitstream is received by the network server and decoded to generate speech vectors. One aspect of a network server design operating at 8 kHz that may be employed is presented in FIG. 7. FIG. 8 illustrates a network server system according to the present design operating at 16 kHz. Bitstream decoding at the network server in the 8 kHz case is performed by the decoder 702 and includes synchronization sequence detection, header decoding and feature decompression. An example of bitstream decoding, synchronization sequence detection, header decoding, and feature decompression may be found in the ETSI document.

Figure 7:
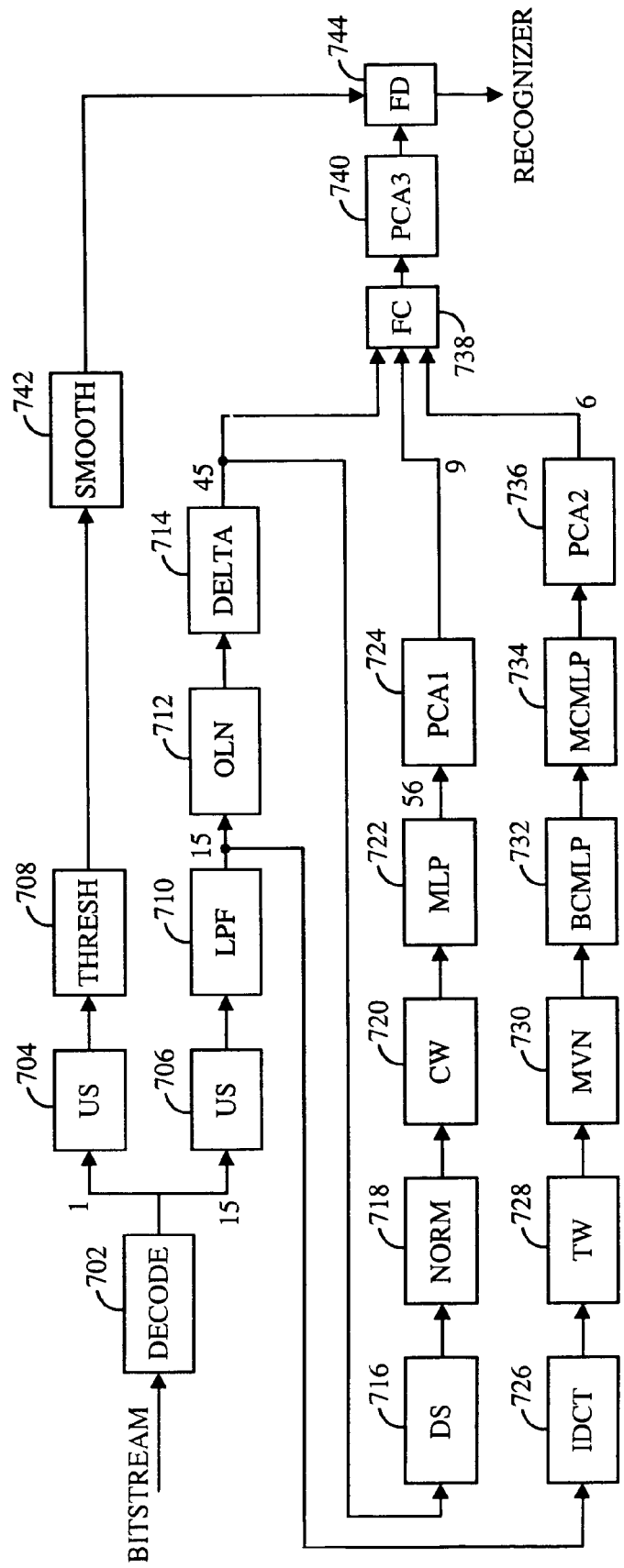
FIG. 7 illustrates the lower frequency network server feature extraction system, including the three streams used to process the received features.
Figure 8:
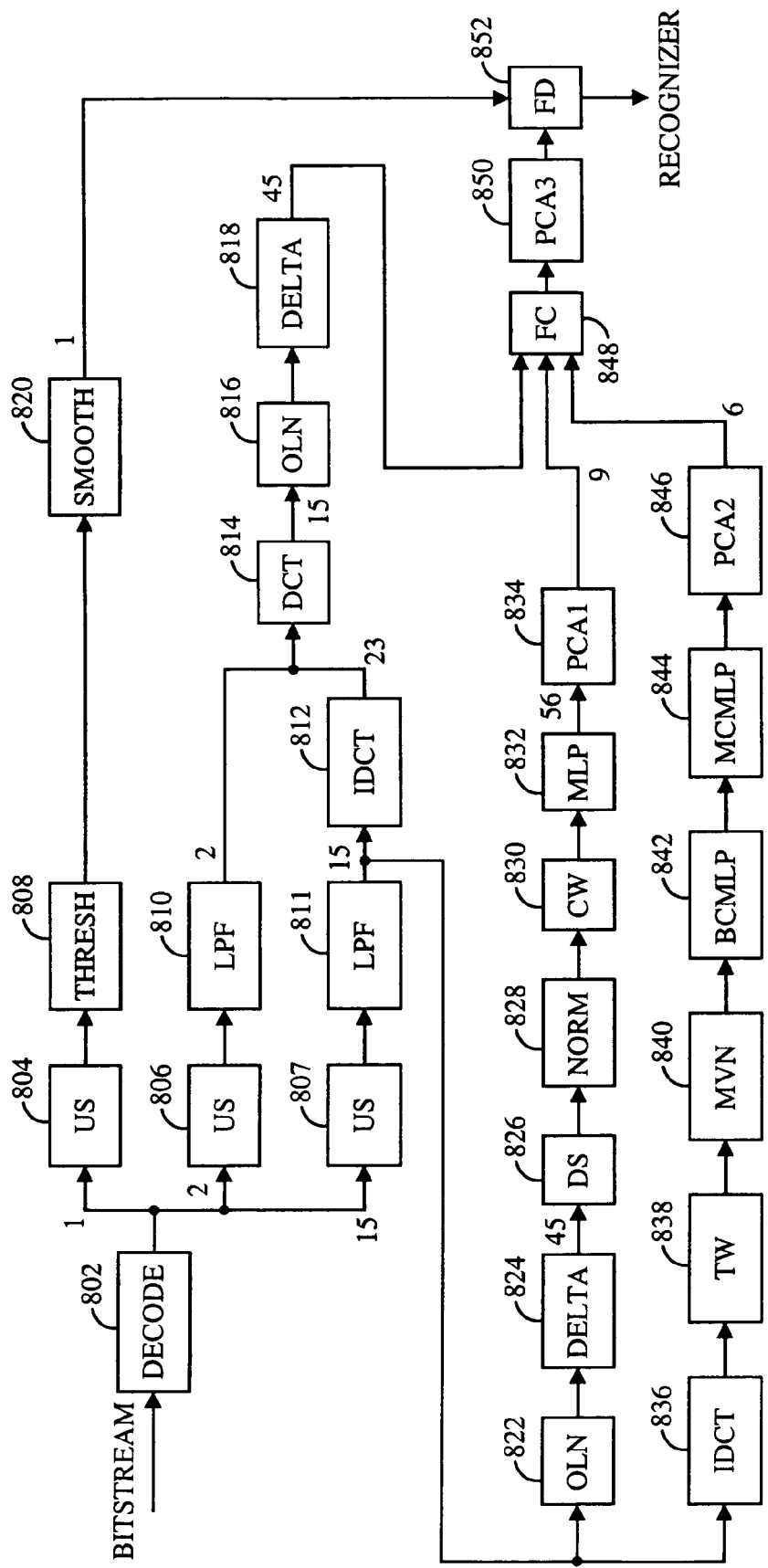
FIG. 8 shows the higher frequency network server feature extraction system, including the modifications to the three streams used to process the received features.

From FIG. 7, three streams of features are generated at the network server from the decompressed packet received from the subscriber station. The first stream includes cepstral features, which are upsampled, mean and variance normalized and augmented with first and second delta (derivative) coefficients. The result of cepstral feature processing is 45 features. The second stream includes cepstral features computed from 0–4 kHz frequency range that are transformed at the network server to estimates of phoneme posterior probabilities using a multi layer perceptron. The network server retains nine features after the dimensionality reduction. The final stream includes the log Mel filter bank energies obtained by an Inverse DCT, which are nonlinearly transformed to estimates of posterior probabilities of manner of articulation (five classes plus one silence class) using a multiband temporal patterns (TRAPs) architecture. Six features are generated using this stream. The final feature vector sent to the back-end recognizer is a concatenation of these three streams. The dimensionality of the final feature vector is 60. Use of these three streams provides information complementary to the cepstral features exclusively employed in previous systems. In particular, the second and third streams, phoneme posterior probabilities, also known as the nonlinear transformation of the cepstral stream, and multiband temporal patterns, can correct some of the errors made by cepstral features, and the cepstral features can correct some of the errors made by the other two streams. The phoneme posterior probabilities and multiband temporal patterns incorporate information from longer time spans than the cepstral features and thus provide enhanced information at the network server.

The following description is directed primarily to the 8 kHz case of FIG. 7, as many of the elements in FIGS. 7 and 8 are similar. Those features in FIG. 8 that differ from FIG. 7 are called out as appropriate.

From FIG. 7, the network server employs error mitigation to reduce transmission errors. Decoder 702 performs error mitigation using Fire code. Fire code is a known error correction strategy that appends a small number of bits to a block of data during encoding so that a single small burst of errors in each data block can be corrected at the receiver. In the present design, the Fire code is employed at the network server, specifically at decoder 702, to repair error bursts of up to five bits and to detect six bits long error bursts.

Figure 13:
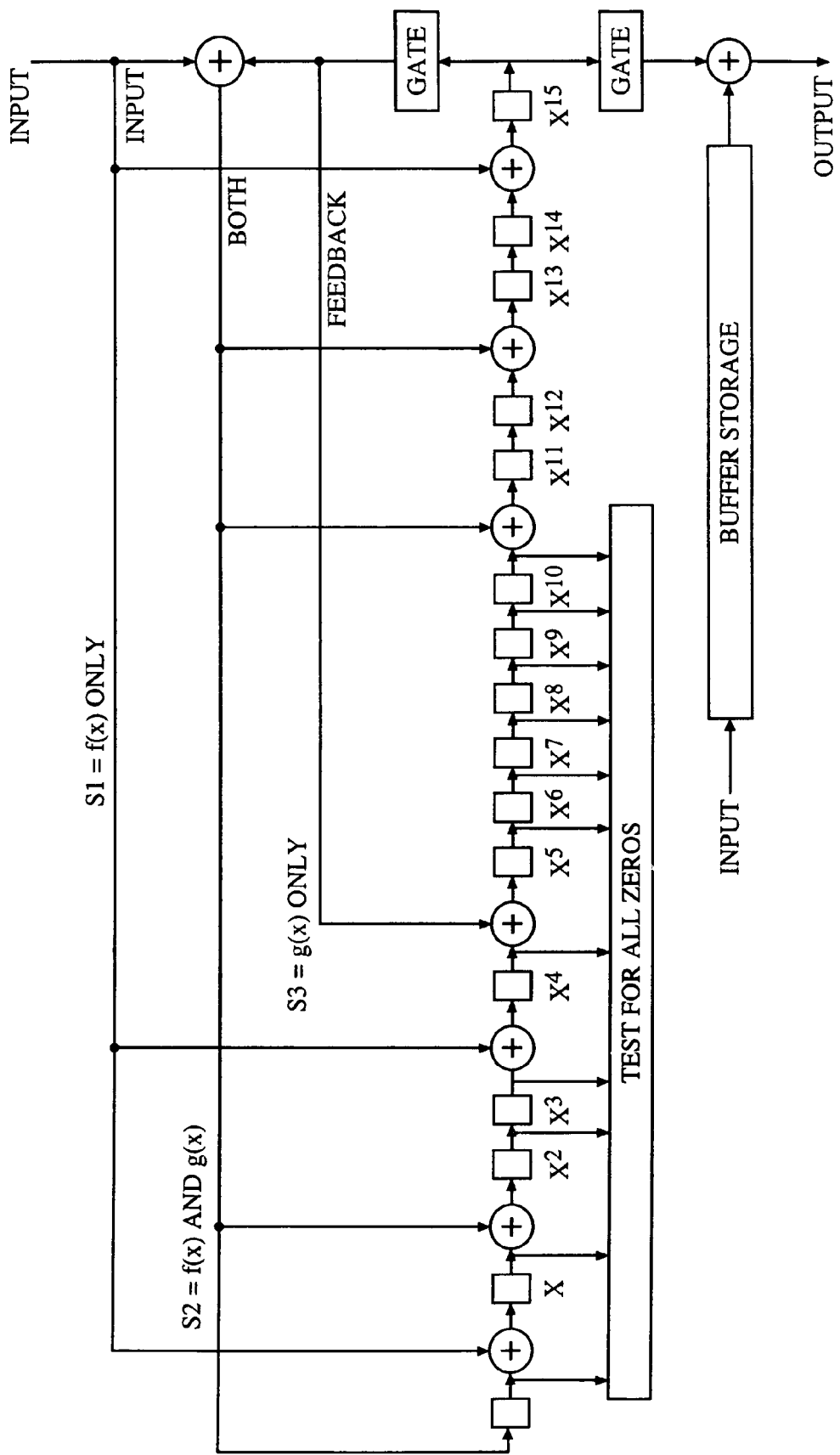
FIG. 13 illustrates computation of the g(x), f(x), and s(x) functions used in accordance with the CRC transmission aspects of the design.

Decoder 702 computes a second polynomial f(X) from the polynomial g(X) for purposes of error correction:

$$g(X) = +X^2 + X^5 + X^{11} + X^{13} + X^{16} \quad (33)$$

$$f(X) = 1 + X + X^2 + X^4 + X^{11} + X^{13} + X^{15} \quad (34)$$

g(x) is the same as on the subscriber station side. F(x) is computed according to the design shown in FIG. 13, and further detail may be found in Peterson et al., Error-Correcting Codes." The received bitstream consists of 76 bits of data and 16 bits of received CRC, or $CRC_{rec}$. The decoder 702 may perform error detection and correction on the received bitstream in two steps.

The decoder 702 computes the CRC again from the received bitstream based on both data and $CRC_{rec}$. The CRC computed by the detector 702 is $CRC_{new}$. The detector 702 divides the received bitstream by polynomial g(X) when the highest significant bit (HSB) of $CRC_{new}$ is 1. The detector divides the received bitstream by polynomial f(X) when the last received bit of the incoming bitstream is 1.

If $CRC_{new}$ is zero, then there are no errors in the frame packet. If $CRC_{new}$ is nonzero, a transmission error has occurred. Detector 702 then uses the computed $CRC_{new}$ for error detection and correction. Only polynomial g(X) is used in this step. Detector 702 uses g(X) to cyclically divide $CRC_{new}$ 92 times (the length of the frame packet). At any point during the division, if the highest 11 bit positions of $CRC_{new}$ are zeros, last five positions give the error burst. The position of the error is given by the division count, such as if the detector 702 has divided $CRC_{new}$ 52 times, and the highest 11 bit positions are zero, the error is in bit position 52. Detector 702 adds the five bits dictating the error burst modulo 2 with the corresponding part of the packet to correct the error. If the highest 11 bit positions are nonzero even after 92 divisions, the detector 702 is unable to correct the errors and the packet is marked as bad.

If the detector 702 finds 2B consecutive bad frames, detector 702 may replace the first B speech vectors by a copy of the last good speech vector before the error. The last B speech vectors may be replaced by a copy of the first good speech vector received after the error. In the case of an odd number of bad frames, one more may be copied from the past than from the future.

Detector 702 provides the decompressed packet to upsampler 704 and lower frequency upsampler 706. Upsampler 704 upsamples the probability $p_n(sil)$ to 100 Hz by linearly interpolating the probability across adjacent values. Threshold application block 708 applies a threshold of 0.5 to the upsampled probability $p_n(sil)$ to convert the upsampled probability $p_n(sil)$ to a binary feature called the silence bit:

$$SilenceBit(n) = 0, \quad if \quad p_n(sil) > 0.5 \quad (35)$$
$$= 1, \quad if \quad p_n(sil) < 0.5$$

Lower frequency upsampler 704 upsamples the features by two using linear interpolation. The cepstral coefficients and energy features are then filtered using LPF block 710 using a low-pass filter with a cutoff frequency of 25 Hz.

$$out(n) = 0.08895249559651 * in(n) + 0.27489720439596 * in(n-1) + \quad (36)$$
$$0.45087105994837 * in(n-2) + 0.45087105994837 * in(n-3) +$$
$$0.27489720439596 * in(n-4) + 0.08895249559651 * in(n-5) +$$
$$0.20466646013718 * out(n-1) - 0.75433478131523 * out(n-2) +$$

-continued 0.01516974960443 * out (n − 3) − 0.09118094189891 * out (n − 4) −

0.00376200640914 * out (n − 4)

From FIG. 8, for sampling rates of 11 and 16 kHz, the 15 cepstral coefficients are linearly transformed to 23 point Mel scale spectrum using Inverse Discrete Cosine Transform (IDCT) block 812. Inverse Discrete Cosine Transform (IDCT) block 812 pads the cepstral coefficients with zeros before the transformation. The two energy features from the 4–8 kHz frequency region received from upper band LPF block 810 are appended to the 23 point Mel spectrum. DCT block 814 applies a 25 point DCT to the 25 element vector to decorrelate the 25 element vector. DCT block 814 retains 15 dimensions from the transformation.

OLN block 712 applies online mean and variance normalization to the LPF filtered cepstral coefficients. In the case of the 8 kHz sampling frequency of FIG. 7, these are the cepstral coefficients representing the 0–4 kHz range. For the 11 and 16 kHz sampling frequencies of FIG. 8, these cepstral coefficients also represent the full frequency range and are obtained using IDCT block 812. Cepstral coefficients are denoted $c_i(n)$ whether received by OLN block 712 or OLN block 816, even though transformation has been applied to the high frequency components in FIG. 8. OLN block 712 updates the estimates of the local mean and variance for each frame marked as speech by the binary silence bit VAD feature. OLN block 712 adds a bias 0 to the variance estimates before normalizing the features. The bias $\theta$ tends to eliminate the effects of small noisy estimates of the variance in the long silence regions.

If SilenceBit(n) is equal to zero, $m_i(n) = m_i(n-1) - \alpha*(m_i(n-1) - c_i(n))$ $\sigma_i(n)^2 = \sigma_i(n-1)^2 - \alpha*(\sigma_i(n-1)^2 - (c_i(n) - m_i(n))^2)$ (37)

If SilenceBit(n) is not equal to zero, $m_i(n) = m_i(n-1)$ $\sigma_i(n)^2 = \sigma_i(n=1)^2$ (38)

$$c'_i(n) = \frac{c_i(n) - m_i(n)}{\sigma_i(n) + \theta}$$ (39)

where $c_i(n)$ is the $i^{th}$ cepstral coefficient at frame n, $m_i(n)$ and $\sigma_i(n)^2$ are the mean and the variance of the $i^{th}$ cepstral coefficient estimated at frame n, and $c'_i(n)$ is the normalized cepstral coefficient at frame n. In one aspect, the value of $\alpha$ is 0.01 and the bias $\sigma$ is 1.0.

The means $m_i$ and variances $\sigma_i$ may be initialized using global means and variances estimated on a noisy speech database. One aspect of the global means and variances are as follows:

$m(-1) = [23.815484, 1.037240, -0.382422, -0.203596, -0.557713,$
$-0.051042, -0.208684, 0.073762, -0.100447, 0.007481,$
$-0.062511, -0.001553, -0.123591, -0.006837, -140246]$

-continued $\sigma(-1)^2 = [5.957326, 1.350153, 0.992368, 0.685526, 0.834512,$
$0.545422, 0.478728, 0.476498, 0.422000, 0.417962,$
$0.351819, 0.361830, 0.323899, 0.322991, 0.287901]$ Delta block 714 derives dynamic features from the normalized static features $c_i(n)$. The derivatives are calculated according to the following regression equation:

$\Delta c_i(n) = (1.0/28)*(-3.0*c_i(n-3) - 2.0*c_i(n-2) - 1.0*$
$c_i(n-1) + 1.0*c_i(n+1) + 2.0*c_i(n+2) + 3.0*c_i(n+3))$ (40)

Delta block 714 also computes the second order derivatives according to the following equation:

$\Delta\Delta c_i(n) = 1.0 c_i(n-3) - 0.6*c_i(n-1)$
$-0.8*c_i(n) - 0.6*c_i(n+1) + 1.0*c_i(n+3)$ (41)

The delta block 714 then appends the first derivative and second derivative to the original 15-dimensional features, yielding a 45-dimensional feature vector. In calculating both the first and second derivatives, delta block 714 may employ a window of a predetermined number of frames. In one aspect, the delta block uses a seven frame window to calculate first and second derivatives, providing a latency of 30 ms coming out of the delta block 714.

From the delta block 714, the 45-dimensional feature vector passes to a downsampling block 716, which downsamples the 45-dimensional feature vector element by two in time. Downsampling reduces the complexity of the multi layer perceptron (MLP) 722, or neural net, without significant degradation in performance. The frame context window 720 stacks five consecutive 45-dimensional feature vector frames together to yield a 225 dimensional input vector to the MLP 722, including a present frame, two previous frames, and two subsequent frames. Stacking creates a delay of 40 ms. Normalization block 718 then normalizes this 225 dimensional input vector by subtracting and dividing the global mean and the standard deviation calculated on features from a training corpus. The global mean is subtracted from the input vector and the result is divided by the standard deviation. The MLP 722 has two layers excluding the input layer; the hidden layer consists of 500 units equipped with sigmoid activation function, while the output layer consists of 56 output units with softmax activation function. The MLP 722 is trained on phonetic targets from labeled TIMIT database, a database commonly available and known to those skilled in the art, with added noise. One aspect of the phonetic target that may be employed is 56 monophones of English. During recognition at the MLP 722, the softmax function in the output units is not employed, and so the output of this block corresponds to "linear outputs" of the MLP hidden layer. The MLP 722 is typically trained using features extracted from speech sampled at 8 kHz. The MLP 722 only uses the cepstral features extracted from 0–4 kHz frequency range for all sampling rates.

Because the subsequent Hidden Markov Models (HMM) used for decoding the linguistic information in the features use diagonal covariance matrices for the gaussian mixtures, the system applies Principal Component Analysis (PCA) to the 56-dimensional "linear output" of the MLP 722 at PCA block 724. The PCA block 724 computes eigenvectors of the total covariance matrix (56×56) of the features from the same database (TIMIT with additive noise) used for training the MLP 722. The PCA block 724 retains the first nine eigenvectors corresponding to the nine largest eigenvalues. The within the PCA block 724 is a 56 by 9 transformation matrix. The PCA block 724 then projects these features onto the nine eigenvectors by multiplying a 1 by 56 vector with a 56 by 9 matrix. The nine resultant features are transmitted by the PCA block 724. A further explanation of the PCA process used in PCA block 724 and the remaining PCA blocks employed herein may be found in "Principal Component Analysis," by I. T. Jolliffe, Springer-Verlag, New York, 1986.

For the high frequency case of FIG. 8, the blocks 716–724 from FIG. 7 are included as blocks 826–834. The online normalization block 816 and delta block 818 described above are incorporated as higher frequency OLN block 822 and higher frequency delta block 824 to employ the 15 element vector from LPF block 811 and perform the normalization and delta processes described above on the 15 element vector.

The third branch receives data from LPF block 710, which is a 15 feature vector, and performs an inverse DCT on the 15 feature vector in IDCT block 726. IDCT block 726 reconstructs a 15 dimensional mel spectrum from the 15 cepstral values received at the network server. IDCT block 726 performs reconstruction using an inverse DCT transformation, without using the two upper band energies. The output of IDCT block 726 is 15 bands.

In the 11 kHz and 16 kHz cases of FIG. 8, the reconstruction takes place based on LPF block 811 outputs rather than based on other points in the arrangement shown in FIG. 8. Temporal pattern features are based on multi-band and multi-stream neural network processing. For each mel-band, Band classifier MLP 732 trains a feed-forward Multi Layer Perceptron (MLP) to classify speech frames into target classes, called band classifiers. Band classifier MLP 732 has one hidden layer with a sigmoid activation function and are trained using a softmax activation function at their outputs. The softmax activation function is known to those of skill in the art. The input to Band classifier MLP 732 is a temporal trajectory of reconstructed mel-band energies. Each temporal trajectory covers a context of 50 frames in the past and 9 frames in the future. The temporal trajectories are mean subtracted, variance normalized and a Hamming window is applied at MVN block 730. The mean and variance are re-estimated for each frame at MVN block 730 using the 60 frames-long temporal trajectory. The number of hidden units is kept at 101 for Band classifier MLP 732. The output units of Band classifier MLP 732 includes manner-based articulatory-acoustic categories (Vowel, Flap, Stop, Fricative, Nasal) as well as the silence. The linear outputs from Band classifier MLP 732 (6 outputs before the final softmax non-linearity) are concatenated and used as input to Merging classifier MLP 734. Merging classifier 734 is trained to classify the same six manner based articulatory targets and has 200 hidden units. The Band classifier 732 and Merging classifier 734 are trained using a noisy speech database, such as TIMIT with artificially added noise. Band classifier 732 and Merging classifier 734 are trained using the phonetic labeling of the database and a canonical mapping between phoneme classes and manner-based classes. During recognition, the Band classifier 732 and Merging classifier 734 do not use the softmax function in the output units, and so the output of Band classifier 732 corresponds to "linear outputs" of the Merging classifier 734 hidden layer. PCA block 736 applies principal component analysis (6 by 6) to decorrelate the outputs. PCA block 736 computes eigenvectors from the total covariance matrix as in the second branch above using the noisy TIMIT database. The PCA retains all the six dimensions, thereby obtaining a 6 by 6 transformation matrix.

The six features from PCA block 736 are appended to the forty-five features from delta block 714 and nine features from PCA block 724 to yield a sixty dimensional feature vector. Finally, PCA block 740 applies principal component analysis to the sixty dimensional feature vector to decorrelate the features. PCA block 740 is computed using the noisy TIMIT database. The principal component analysis of PCA block 740 retains all sixty dimensions.

Smoothing block 742 smooths the silence bit using a "rank ordering" filter:

$$SmoothSilenceBit(n) = 1 \quad (42)$$
$$\text{if } \sum_{i=\max(0,n-10)}^{\min(n+10,N_{fr}-1)} (1 - SilenceBit(i)) < 5$$

where N is the number of frames in the utterance. The smoothed version of the silence bit is used to drop non-speech frames. A frame n with SmoothSilenceBit(n) equal to 1 will not be sent to the back-end recognizer. Frame dropping block 744 performs the evaluation of each frame with respect to the smooth silence bit.

Figure 9:
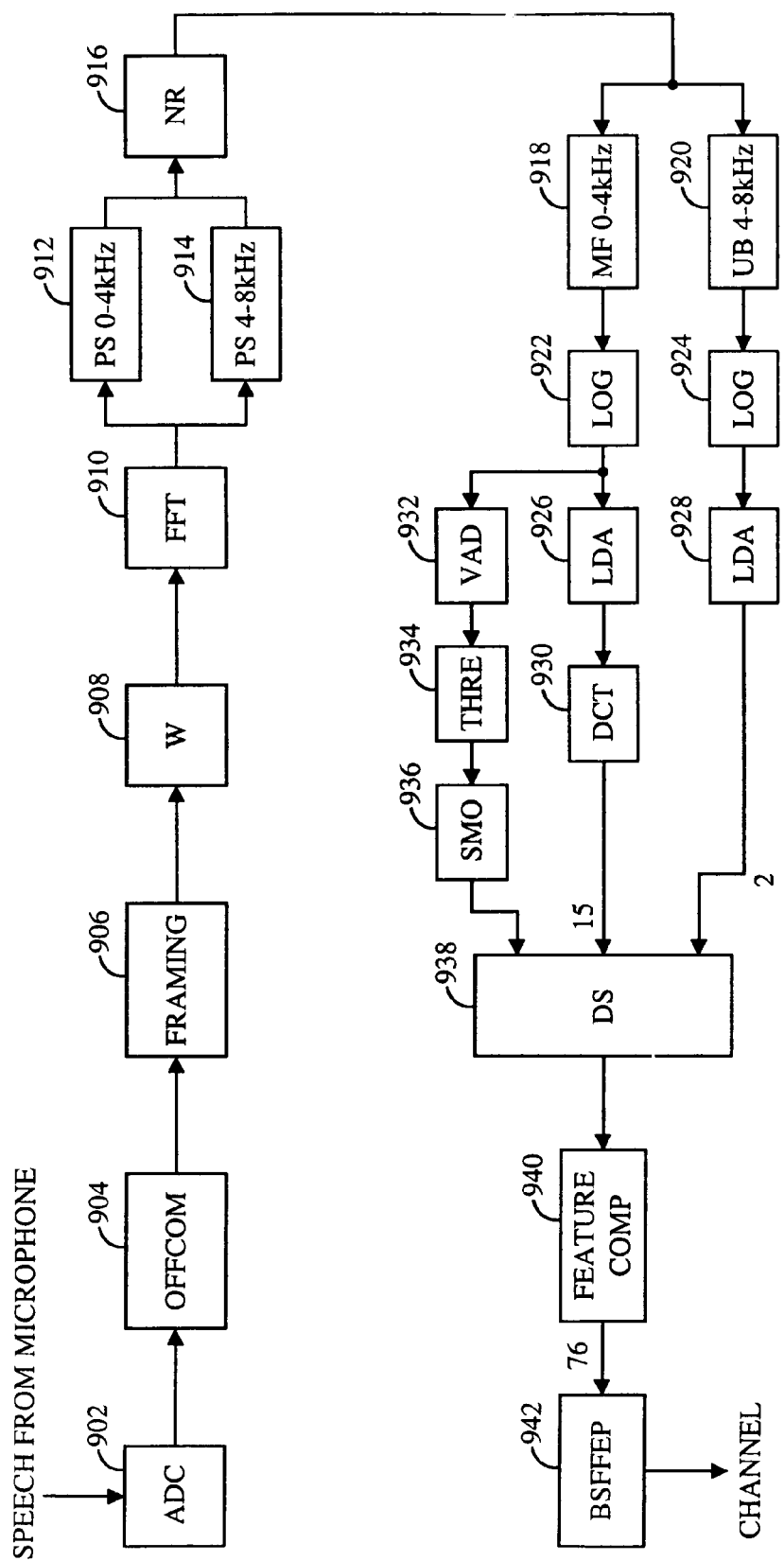
FIG. 9 is an alternate aspect of the subscriber station side of the current design using smoothing and thresholding to inhibit transmission of silence features or feature related data.
Figure 10:
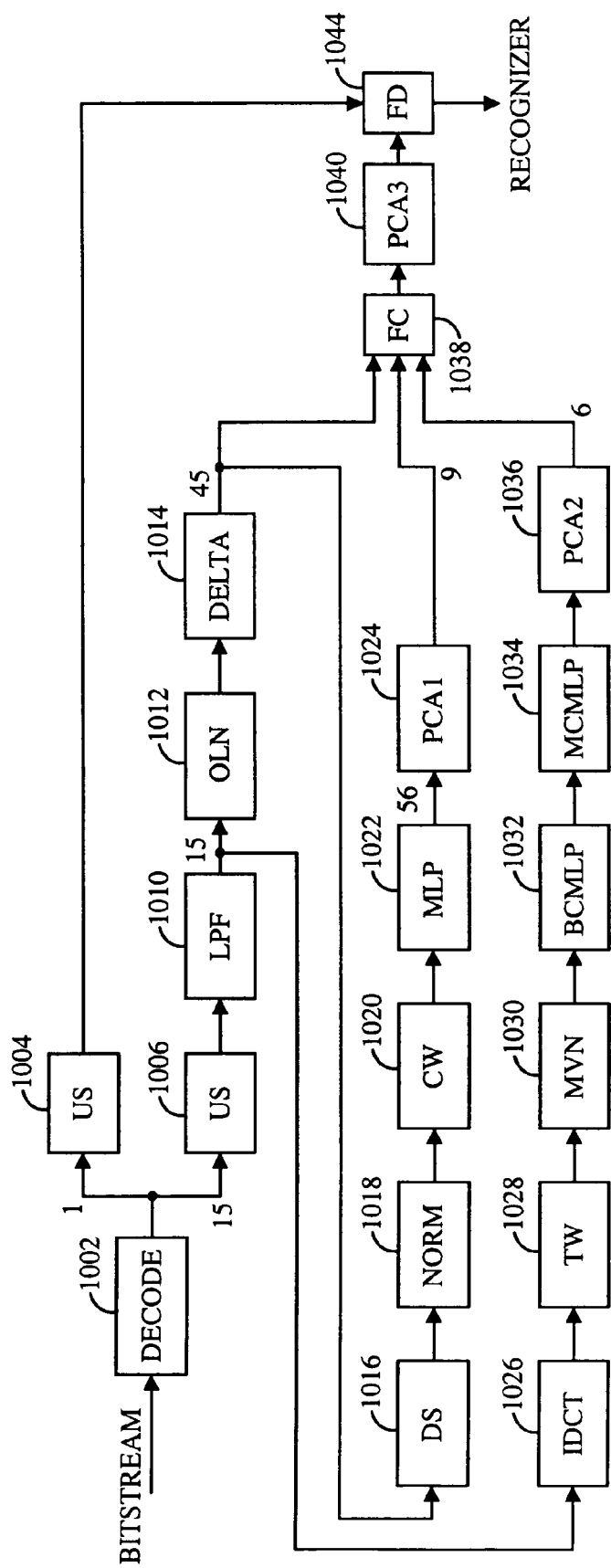
FIG. 10 shows an alternate aspect of the lower frequency network server side of the current design with smoothing and thresholding omitted to assist in inhibiting transfer of silence from the subscriber station to the network server.
Figure 11:
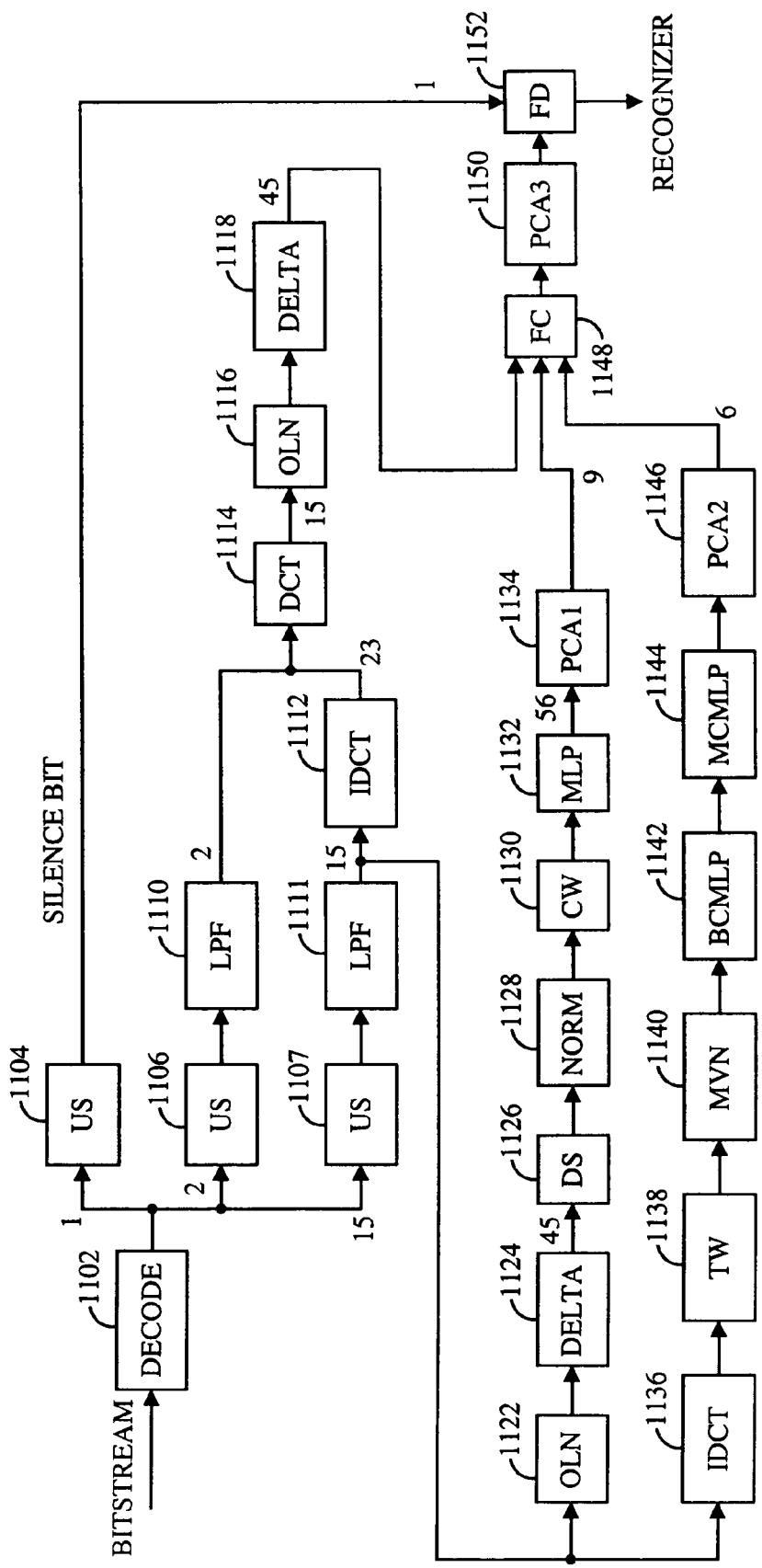
FIG. 11 shows an alternate aspect of the higher frequency network server side of the current design with smoothing and thresholding omitted to assist in inhibiting transfer of silence from the subscriber station to the network server.

FIGS. 9–11 illustrate an alternative aspect of the present invention employing thresholding and smoothing on the subscriber station side of the system rather than the network server side. Offloading this processing into the subscriber station enables frame dropping at the handset rather than transmitting silence across to the network server and obviates all transmission and processing inherent therein. The thresholding and smoothing occurs at threshold block 934 and smoothing block 936, which perEorms substantially the same as threshold block 708 and smoothing block 742. The result is that only frames of nonsilence are passed from the VAD block 932 to the downsampler 938, which combines the nonsilence probability with the lower frequency features from DOT block 930 and LDA block 926. Downsampler 938 downsamples the combined vector, and feature compression block 940 selects only those frames containing nonsilence for transmission. This selection requires additional processing in feature compression block 940 over that provided in feature compressor 336. Thus, as may be appreciated by one skilled in the art, all components of FIG. 9 exclusive of these thresholding and smoothing blocks perform the same functions as those of FIG. 3, all components of FIG. 10 exclusive of the thresholding and smoothing blocks perform the same functions as those of FIG. 7, and all components of FIG. 11 exclusive of the thresholding and smoothing blocks perform the same functions as those of FIG. 8. As the functionality of the individual recited elements is identical to that discussed above, the elements of FIGS. 9–11 will not be discussed in detail.

Thus, a novel and improved method and apparatus for distributed voice recognition utilizing high frequency components on the subscriber unit side and three branches for processing cepstral coefficients, nonlinear transformations, and multiband temporal patterns on the network server side has been described. Those of skill in the art will understand that the various illustrative logical blocks, modules, and mapping described in connection with the aspects disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, and mapping described in connection with the aspects disclosed herein may be implemented or performed with a processor executing a set of firmware instructions, an application specific integrated circuit (ASIC), a field programmable gate array (FPGA) or other programmable logic device, discrete gate or transistor logic, discrete hardware components such as, e.g., registers, any conventional programmable software module and a processor, or any combination thereof designed to perform the functions described herein. Functionality denoted by the various components presented may advantageously be executed in a microprocessor, but in the alternative, may be executed in any conventional processor, controller, microcontroller, or state machine. Data and information could reside in RAM memory, flash memory, ROM memory, EPROM memory, EEPROM memory, registers, hard disk, a removable disk, a CD-ROM, or any other form of storage medium known in the art. The memory (not shown) may be integral to any aforementioned processor (not shown). A processor (not shown) and memory (not shown) may reside in an ASIC (not shown). The ASIC may reside in a subscriber station.

The previous description of the embodiments of the invention is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the and novel features disclosed herein.

What is claimed is:

1. A method of processing, transmitting, receiving, and decoding speech information, comprising:
    receiving signals representing speech;
    decomposing said signals representing speech into higher frequency components and lower frequency components;
    processing said higher frequency components and said lower frequency components separately and combining processed higher frequency components and lower frequency components into a plurality of features;
    transmitting said features to a network;
    receiving said features and processing said received features using a plurality of streams, said plurality of streams comprising a cepstral stream, a nonlinear neural network stream, and a multiband temporal pattern architecture stream; and
    concatenating all received features processed by said plurality of streams into a concatenated feature vector.

2. The method of claim 1, wherein said receiving of signals, decomposing, processing, and transmitting are performed at a subscriber station.

3. The method of claim 1, wherein said receiving of features and processing and concatenating are performed at a network server.

4. The method of claim 1, wherein said method may be employed at multiple frequency rates.

5. The method of claim 1, wherein said nonlinear neural network stream comprises a nonlinearly transforming the cepstral stream using a multi layer perceptron to discriminate between phoneme classes in said features.

6. The method of claim 1, wherein said multiband temporal pattern architecture comprises mel spectra reconstruction and employs at least one multi layer perceptron to discriminate between manner of articulation classes in each mel spectral band.

7. The method of claim 1, wherein the cepstral stream comprises a processing arrangement able to compute mean and variance normalized cepstral coefficients and at least one derivative thereof.

8. The method of claim 1, wherein said transmitting comprises determining a cyclic redundancy check value for the features, and transmitting the cyclic redundancy check value with the features.

9. The method of claim 8, wherein said receiving of features comprises receiving a group of features and their cyclic redundancy check, and processing the cyclic redundancy check to determine whether errant features are present in said received group of features and optionally provide corrected errant features.

10. A system for processing speech into a plurality of features, comprising:
    an analog to digital converter able to convert analog signals representing speech into a digital speech representation;
    a fast fourier transform element for computing a magnitude spectrum for the digital speech representation;
    a power spectrum splitter for splitting the magnitude spectrum into higher and lower frequency components;
    a noise power spectrum estimator and a noise reducer for estimating the power spectrum and reducing noise of said higher and lower frequency components to noise reduced higher frequency components and noise reduced lower frequency components;
    a mel filter for mel filtering the noise reduced lower frequency components;
    a plurality of linear discriminant analysis filters for filtering the mel filtered noise reduced lower frequency components and the noise reduced higher frequency components;
    a combiner for combining the output of the linear discriminant analysis filters with a voice activity detector representation of the mel filtered noise reduced lower frequency components; and
    a feature compressor for compressing combined data received from the combiner.

11. The system of claim 10, wherein the fast fourier transform element, power spectrum splitter, noise power spectrum estimator and noise reducer, mel filter, plurality of linear discriminant analysis filters, combiner, and feature compressor operate on a subscriber station.

12. The system of claim 10, wherein said system has an ability to operate at multiple frequencies.

13. The system of claim 10, wherein said feature compressor produces a plurality of compressed features, and wherein said system further comprises transmitter for transmitting said plurality of compressed features.

14. The system of claim 13, wherein said transmitter transmits said features to a network server having the ability to interpret the compressed features.

15. The system of claim 10, wherein said power spectrum splitter splits the magnitude spectrum into lower frequency components ranging between approximately 0 kHz to approximately 4 kHz, and higher frequency components ranging in excess of approximately 4 kHz.

16. A system for decoding features incorporating information from a relatively long time span of feature vectors, comprising:
   a multiple stream processing arrangement, comprising:
      a cepstral stream processing arrangement for computing mean and variance normalized cepstral coefficients and at least one derivative thereof;
      a nonlinear transformation of the cepstral stream comprising a multi layer perceptron to discriminate between phoneme classes in said features; and
      a multiband temporal pattern architecture stream comprising mel spectra reconstruction and at least one multi layer perceptron to discriminate between manner of articulation classes in each mel spectral band; and
   a combiner to concatenate features received from said cepstral stream processing arrangement, said nonlinear transformation of the cepstral stream, and said multiband temporal pattern architecture stream.

17. The system of claim 16, further comprising a receiver for receiving features and providing received features to the multiple stream processing arrangement.

18. The system of claim 17, wherein said receiver further receives a cyclic redundancy check.

19. The system of claim 18, further comprising a decoder for decoding the received features and cyclic redundancy check and determining errant received features therefrom.

20. The system of claim 16, wherein the multiband temporal pattern architecture stream further comprises an inverse discrete cosine transformation element and said at least one multi layer perceptron comprises a band classifier multi level perceptron.

21. The system of claim 16, further comprising a principal component analysis block receiving concatenated features from said combiner.

22. The system of claim 21, further comprising a frame dropper receiving data from said principal component analysis block, said frame dropper removing frames of data comprising silence.

\* \* \* \* \*